United States Patent [19]
Yoshida

[11] Patent Number: 5,422,729
[45] Date of Patent: Jun. 6, 1995

[54] INFORMATION PROCESSING METHOD AND APPARATUS IN WHICH DIVISION OF DRAWING COMMAND IS EXECUTED EVERY PAGE

[75] Inventor: Shigeo Yoshida, Yokohama, Japan

[73] Assignee: Canon Kabushiki Kaisha, Tokyo, Japan

[21] Appl. No.: 87,044

[22] Filed: Jul. 7, 1993

[30] Foreign Application Priority Data

Jul. 9, 1992 [JP] Japan .................................. 4-182458

[51] Int. Cl.⁶ .............................................. H04N 1/41
[52] U.S. Cl. .................................. 358/400; 358/462
[58] Field of Search ............................. 358/400–401, 358/462; 395/103, 110, 112–113

[56] References Cited

U.S. PATENT DOCUMENTS

| | | | |
|---|---|---|---|
| 4,979,049 | 12/1990 | Chamzas | 358/462 |
| 5,073,953 | 12/1991 | Westdijk | 358/462 |
| 5,075,788 | 12/1991 | Funada | 358/462 |
| 5,138,465 | 8/1992 | Ng | 358/462 |

*Primary Examiner*—Stephen Brinich
*Attorney, Agent, or Firm*—Fitzpatrick, Cella, Harper & Scinto

[57] ABSTRACT

Information processing method and apparatus are provided. A drawing command is divided into a plurality of drawing commands. The divided drawing commands and the information to designate a printer are added, thereby producing a plurality of drawing packet groups. In order to convert the packet groups into the images suitable for a printing mechanism, the packet groups are transmitted so as to be allocated to a plurality of information processing sections. The drawing command is divided every page to be printed.

19 Claims, 22 Drawing Sheets

{
1 ~ TEXT "NAVI", (5, 5), GOTHIC, 12 POINTS
2 ~ RECTANGLE (10, 120), (30, 120), (10, 130), (30, 130), REPLACE, NONE
3 ~ TRIANGLE (40, 40), (10, 70), (70, 70), REPLACE, PATTERN 1
4 ~ BITIMAGE (60, 90), (90, 90), (60, 120), (90, 120), "mountain", REPLACE

FIG. 4

```
#401 ~ REGION 1 = CLIP (0, 0), (100, 50)
#402 ~           TEXT "NAVI", (5, 5) GOTHIC, 12 POINTS
#403 ~           TRIANGLE (40, 40), (10, 70), (70, 70), REPLACE, PATTERN 1

#404 ~ REGION 2 = CLIP (0, 50), (100, 100)
#405 ~           TRIANGLE (40, 40), (10, 70), (70, 70), REPLACE, PATTERN 1
#406 ~           BITIMAGE (60, 90), (90, 90), (60, 120), (90, 120), "mountain",
                 REPLACE

#407 ~ REGION 3 = CLIP (0, 100), (100, 50)
#408 ~           RECTANGLE (10, 120), (30, 120), (10, 130), (30, 130), REPLACE,
                 NONE
#409 ~           BITIMAGE (60, 90), (90, 90), (60, 120), (90, 120), "mountain",
                 REPLACE
```

FIG. 5

DRAWING PACKET

```
#501 ~ PACKET 1 = To:PRINTER 1
#502 ~            Printer:PRINTER 1
#503 ~            From:MYPC
#504 ~            BAND NO.=1
#505 ~            BAND Total=3
#506 ~            Document Name "sample. doc"
#507 ~            Packet ID=92061111942-001
#508 ~            Print Address=0
#509 ~            Page=1
#510 ~            Data{
#511 ~                  CLIP (0, 0), (100, 500)
#512 ~                  TEXT "NAVI", (5, 5) GOTHIC, 12 POINTS
#513 ~                  TRIANGLE (40, 40), (10, 70), (70, 70), REPLACE,
                        PATTERN 1
#514 ~            }

#515 ~ PACKET 2 = To:MYPC
#516 ~            Printer:PRINTER 1
#517 ~            From:MYPC
#518 ~            BAND NO.=2
#519 ~            BAND Total=3
#520 ~            Document Name "sample. doc"
#521 ~            Packet ID=92061111942-002
#522 ~            Print Address=50
#523 ~            Page=1
#524 ~            Data{
#525 ~                  CLIP (0, 50), (100, 100)
#526 ~                  TRIANGLE (40, 40), (10, 70), (70, 70), REPLACE,
                        PATTERN 1
#527 ~                  BITIMAGE (60, 90), (90, 90), (60, 120), (90, 120),
                              (mountain:××~××), REPLACE
#528 ~            }

#529 ~ PACKET 3 = To:PC 2
#530 ~            Printer:PRINTER 1
#531 ~            From:MYPC
#532 ~            BAND NO.=3
#533 ~            BAND Total=3
#534 ~            Document Name "sample. doc"
#535 ~            Packet ID=92061111942-003
#536 ~            Print Address=100
#537 ~            Page=1
#538 ~            Data{
#539 ~                  CLIP (0, 150), (100, 150)
#540 ~                  RECTANGLE (10, 120), (30, 120), (10, 130), (30, 130),
                        REPLACE, NONE
#541 ~                  BITIMAGE (60, 90), (90, 90), (60, 120), (90, 120),
                              (mountain:××~××), REPLACE
#542 ~            }
```

FIG. 12
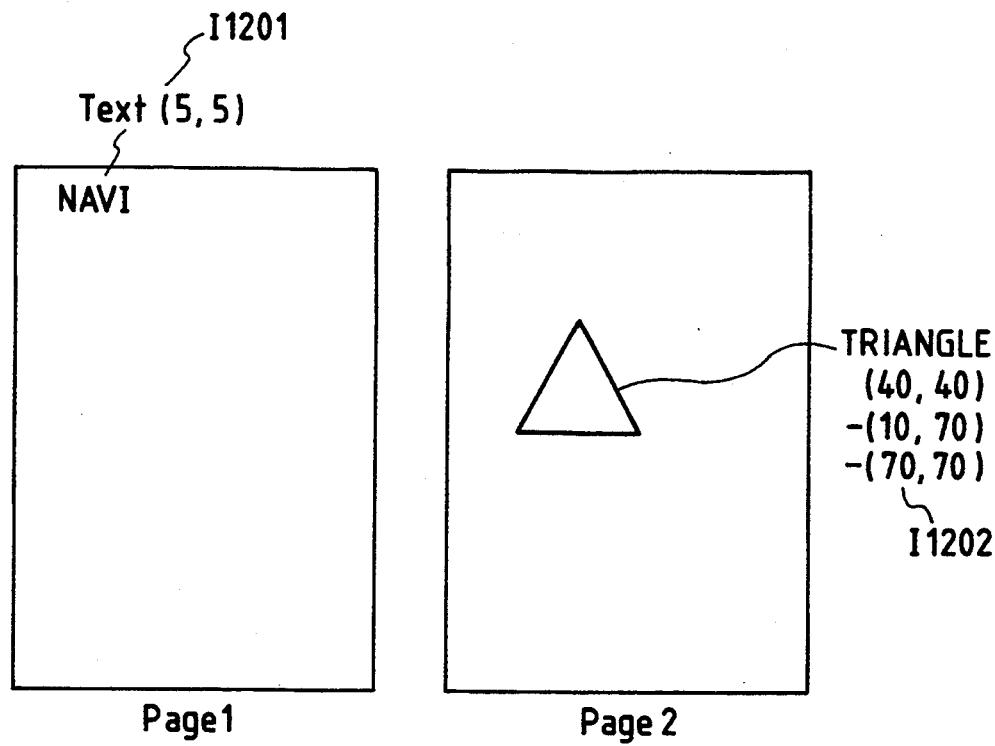
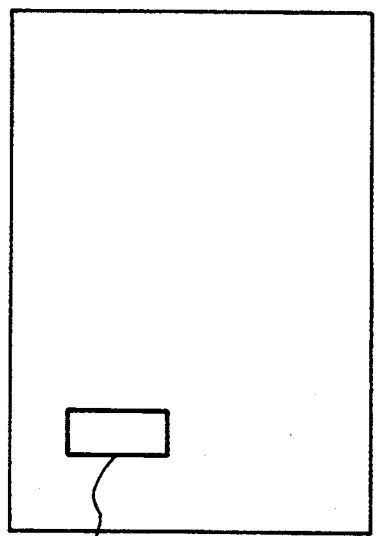

FIG. 13

1301 ～ TEXT "NAVI" (Page 1), (5, 5), GOTHIC, 12 POINTS
1302 ～ TRIANGLE (Page 2), (40, 40), (10, 70), (70, 70), REPLACE, PATTERN 1
1303 ～ RECTANGLE (Page 3), (10, 120), (30, 120), (10, 130), (30, 130), REPLACE, NONE

FIG. 19

1901 ～ CIRCLE (20, 10), 5
1902 ～ RECTANGLE (10, 30), (30, 30), (10, 60), (30, 60), REPLACE, NONE
1903 ～ PAINT (15, 35), PATTERN 1
1904 ～ PAINT (40, 50), PATTERN 2

FIG. 14

```
#1401 ~  PACKET 1 = To:PRINTER 1
#1402 ~            Printer:PRINTER 1
#1403 ~            From:MYPC
#1404 ~            Document Name "sample. doc"
#1405 ~            Packet ID=9206272304-001
#1406 ~            Page=1
#1407 ~            Data{
#1408 ~                 TEXT "NAVI", (5, 5) GOTHIC, 12 POINTS
#1409 ~            }

#1410 ~  PACKET 2 = To:MYPC
#1411 ~            Printer:PRINTER 1
#1412 ~            From:MYPC
#1413 ~            Document Name "sample. doc"
#1414 ~            Packet ID=9206272304-002
#1415 ~            Page=2
#1416 ~            Data{
#1417 ~                 TRIANGLE (40, 40), (10, 70), (70, 70), REPLACE,
                         PATTERN 1
#1418 ~            }

#1419 ~  PACKET 3 = To:PC 2
#1420 ~            Printer:PRINTER 1
#1421 ~            From:MYPC
#1422 ~            Document Name "sample. doc"
#1423 ~            Packet ID=9206272304-003
#1424 ~            Page=3
#1425 ~            Data{
#1426 ~                 RECTANGLE (10, 120), (30, 120), (10, 130), (30, 130),
                         REPLACE, NONE
#1427 ~            }
```

FIG. 23

2201 ~ BITIMAGE (20, 30), (60, 30), (20, 80), (60, 80), "mountain 2", REPLACE
2202 ~ RECTANGLE (10, 20), (40, 20), (10, 60), (40, 60), REPLACE, NONE
2203 ~ TEXT "ABC", (15, 45), GOTHIC, 12 POINTS
2204 ~ TEXT "DEF", (40, 15), GOTHIC, 12 POINTS

FIG. 24

2301 ~ BITIMAGE (20, 30), (60, 30), (20, 80), (60, 80), "mountain 2", REPLACE
2302 ~ RECTANGLE (10, 20), (40, 20), (10, 60), (40, 60), REPLACE, NONE
2203 ~ TEXT "ABC", (15, 45), GOTHIC, 12 POINTS
2204 ~ TEXT "DEF", (40, 15), GOTHIC, 12 POINTS

FIG. 25

```
#2401 ~ PACKET 1 = To:PRINTER 1
#2402 ~            Printer:PRINTER 1
#2403 ~            From:MYPC
#2404 ~            Document Name "test. doc"
#2405 ~            Packet ID=9206292153-001
#2406 ~            Page=1
#2407 ~            Data{
#2417 ~                 BITIMAGE (40, 30), (60, 30), (60, 90), (20, 90), (20, 70),
                                 (40, 70), REPLACE, NONE
#2408 ~                 RECTANGLE (10, 20), (40, 20), (40, 30), (10, 30),
                                 REPLACE, PATTERN 1
#2409 ~                 POLYGON (10, 35), (15, 35), (15, 45), (35, 45), (35, 35),
                                 (40, 35), (40, 60), (10, 60), REPLACE, NONE
#2410 ~            }

#2411 ~ PACKET 2 = To:MYPC
#2412 ~            Printer:PRINTER 1
#2413 ~            From:MYPC
#2414 ~            Document Name "test. doc"
#2415 ~            Packet ID=9206292153-002
#2416 ~            Page=2
#2417 ~            Data{
#2418 ~                 TEXT "ABC", (15, 45) GOTHIC, 12 POINTS
#2419 ~                 TEXT "DEF", (40, 15) GOTHIC, 12 POINTS
#2420             }
```

INFORMATION PROCESSING METHOD AND APPARATUS IN WHICH DIVISION OF DRAWING COMMAND IS EXECUTED EVERY PAGE

BACKGROUND OF THE INVENTION

1. Field of the Invention

The present invention relates to an information processing method and apparatus regarding an information processing section of a computer or the like or, further, an information processing section having a printing function.

2. Related Background Art

A conventional computer only has printed only characters of fixed sizes of a few levels.

Therefore, a character code is sent from the computer to a printer and the character code is converted into a bit image of the character by using font data included in the printer and the bit image is generated.

However, in association with the improvement of a processing ability of the recent computer, vector graphics, a bit image, and an outline font are combined and displayed on the computer and an image is displayed or output more graphically and beautifully.

To print such a document, a printer which can develop the vector graphics or outline font must be used, so that the printer becomes complicated and the costs rise.

This is because there is a drawback such that since complicated calculations such as a Bezier curve or the like needed to develop the outline font, a practical printing speed cannot be obtained unless an information processing ability of the printer is high. On the other hand, although the printer ordinarily has fonts of characters to be printed, in case of the outline font, an amount of data which is necessary for one character is larger than that of a bit map font. Moreover, since the printer generally has a plurality of kinds of fonts (Gothic style, Ming style, Textbook style, and the like), a capacity of a font memory that is necessary is large. A hard disc, a special ROM, or the like must be prepared.

Further, when vector graphics are drawn, if special hardware is not used, the printing speed decreases. When there is not a page memory of a capacity corresponding to one page, the printing speed also decreases.

On the other hand, there is also a method whereby a print image is formed in a computer and only a final bit image is sent to a printer and is printed. However, to form an image, complicated processings are also similarly necessary. Consequently, there is a drawback such that when the operator tries to use the computer for another processing during the formation of the print image, a response speed remarkably becomes slow.

When considering a future technical trend, it is presumed that a printing resolution becomes high and a print color changes from the monochromatic color to the color and that an amount of information to be processed extremely increases.

When the processing ability for developing drawing commands such as character train of an outline font or the like, a vector graphics command, a bit image, or the like into a print image is insufficient for a computer sole body or a printer sole body, in place of enhancing the processing ability of the sole body of each of the computer and printer, the drawing commands are developed in parallel by a plurality of computers or the printer. Due to this, the shortage of the processing ability is eliminated.

That is, it is sufficient that the drawing commands are simultaneously developed into print images by a plurality of print image processors and are again returned to the original print images by the printer.

However, since a drawing command train has information as a casual relation due to the commands such as vector graphics, outline font, and the like, even when the drawing command train is merely simply separated, a correct image cannot be always formed because of the vertical relation or the like of a figure.

Even when the vertical relation is decided to a certain degree and the drawing commands are divided, there is also a drawing command such as a "painting command" such that it is difficult to decide on which region an influence is exerted by only the coordinates included in the command.

In the development of the bit image in each of the divided regions, it is difficult to presume which computer will finish the development at first because it varies depending on a load state of each computer and complication of the drawing command train.

That is, since the print images after they were developed into the bit images reach the printer at random, the order to print a group of packets causes a problem.

Further, even in the case where the print image processings are executed at a plurality of locations, it is inconvenient unless an error processing (paper jam, lack of papers, shortage of print ink, or the like) is executed or the operation (interruption of the printing or the like) from the user for the printer is executed in a manner similar to the case where the ordinary printer is used.

SUMMARY OF THE INVENTION

The present invention is made in consideration of the above drawbacks and it is an object of the invention to realize a high printing speed and low costs by developing a drawing command train into print images in parallel in a plurality of computers including a computer to generate a drawing command or a plurality of printers.

In consideration of the above drawbacks, it is another object of the invention to provide information processing method and apparatus in which a drawing command is divided into a plurality of portions, a plurality of drawing packet groups are formed by adding the divided drawing commands and information to designate a printer, and the packet groups are transmitted so as to be allocated to a plurality of information processing sections in order to develop the packet groups into images suitable for the printing mechanisms.

BRIEF DESCRIPTION OF THE DRAWINGS

FIG. 4 is a diagram showing a drawing command train for each region in the first embodiment of the invention;

FIG. 5 is a diagram showing drawing packets in the first embodiment;

FIG. 12 is a diagram showing examples of print images according to the second embodiment of the invention;

FIG. 13 is a diagram showing drawing commands in the second embodiment of the invention;

FIG. 14 is a diagram showing a drawing packet group in the second embodiment of the invention;

FIG. 19 is a diagram showing drawing commands in the third embodiment of the invention;

Figures 1, 3:
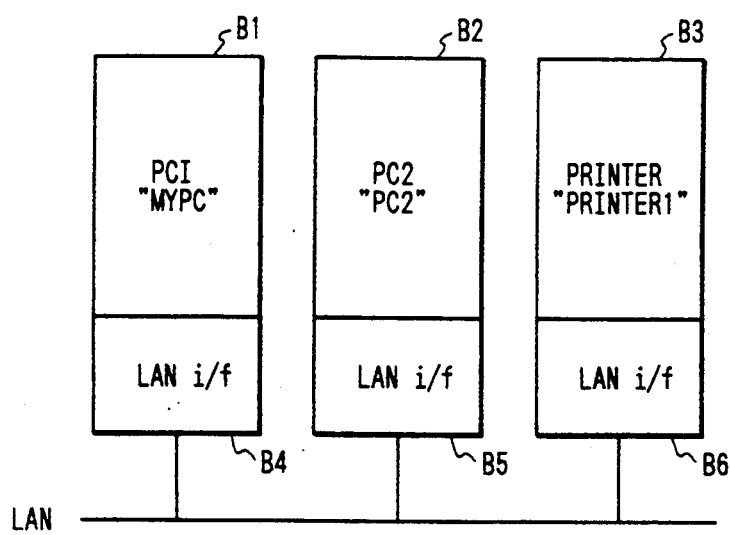
FIG. 1 is a block diagram showing a whole concept of an information processing apparatus according to the first embodiment.
FIG. 3 is a diagram showing drawing commands in the first embodiment.
Figure 21:
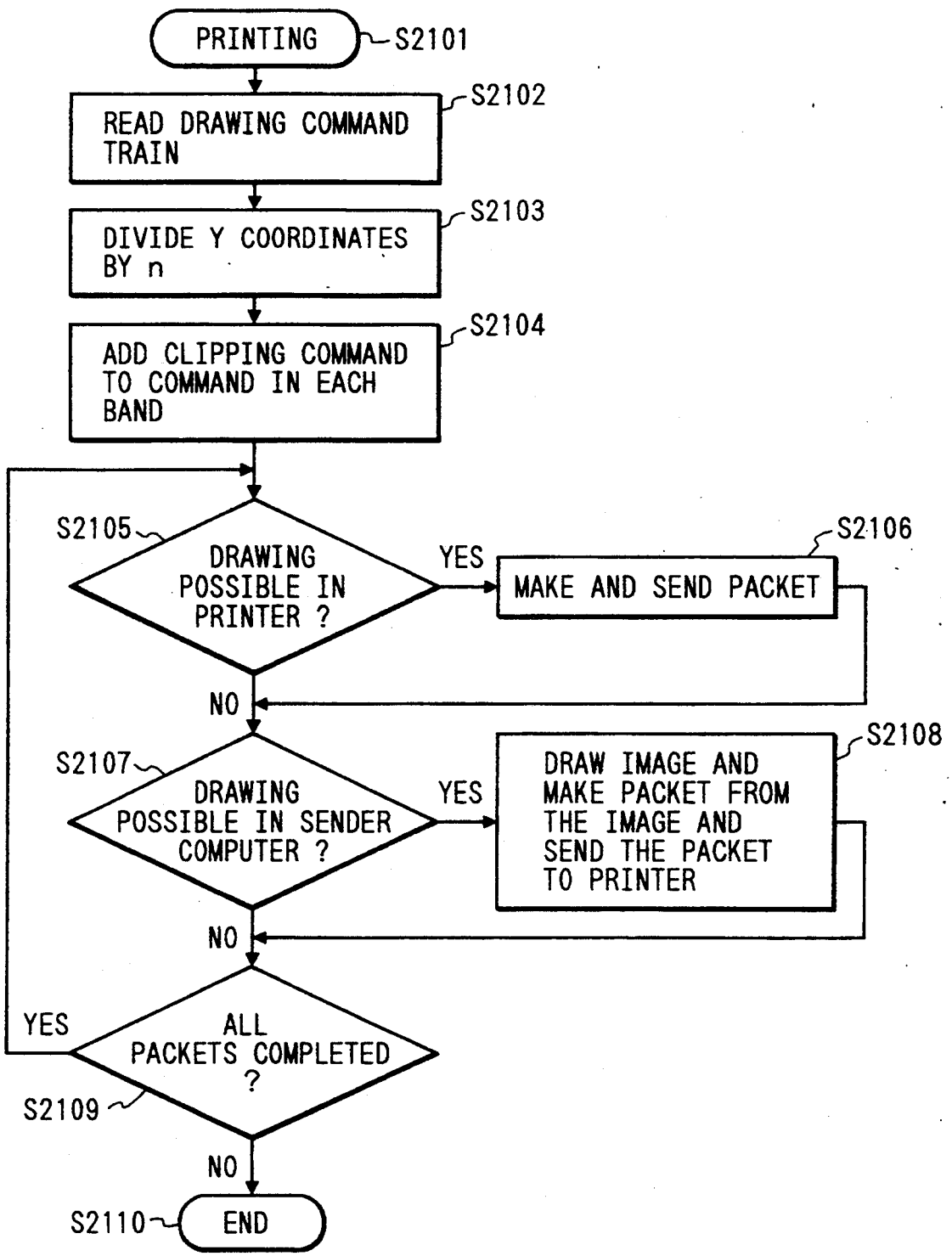
Figure 22:
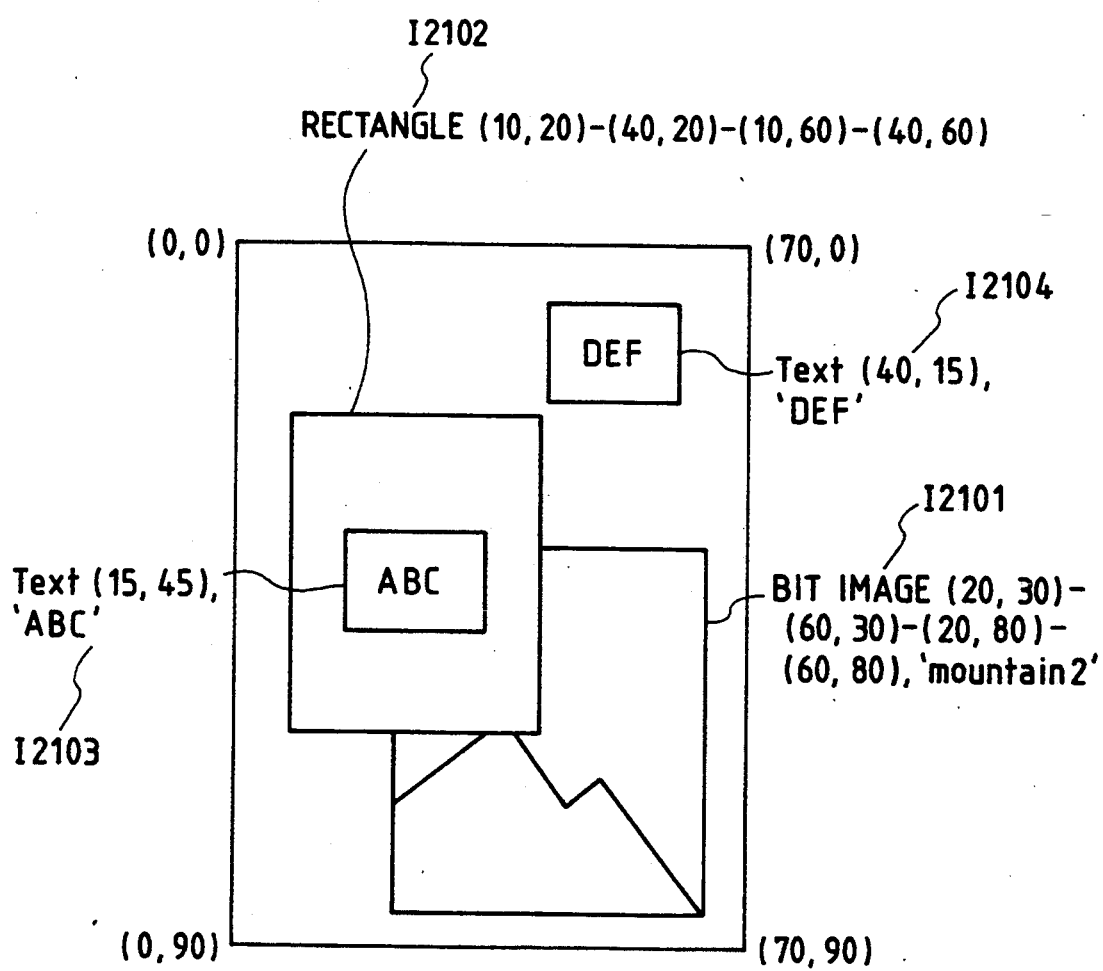
Figure 26:
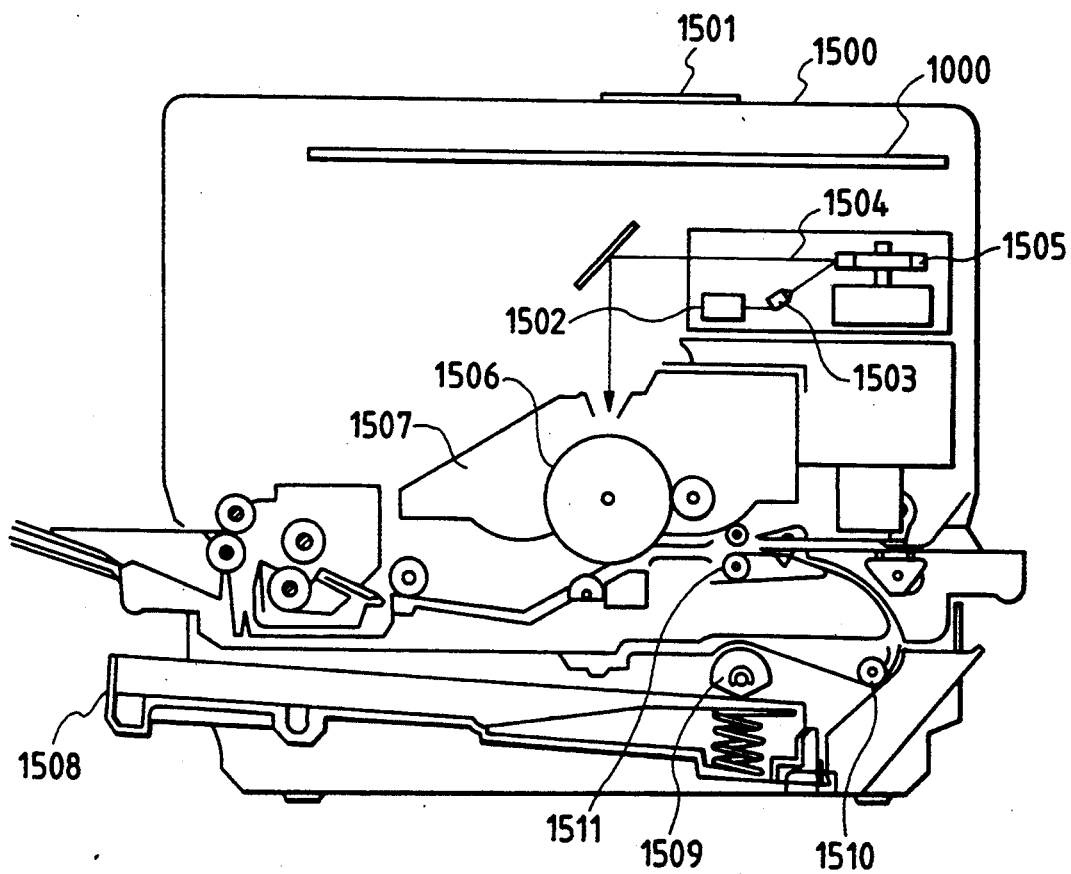
Figure 27:
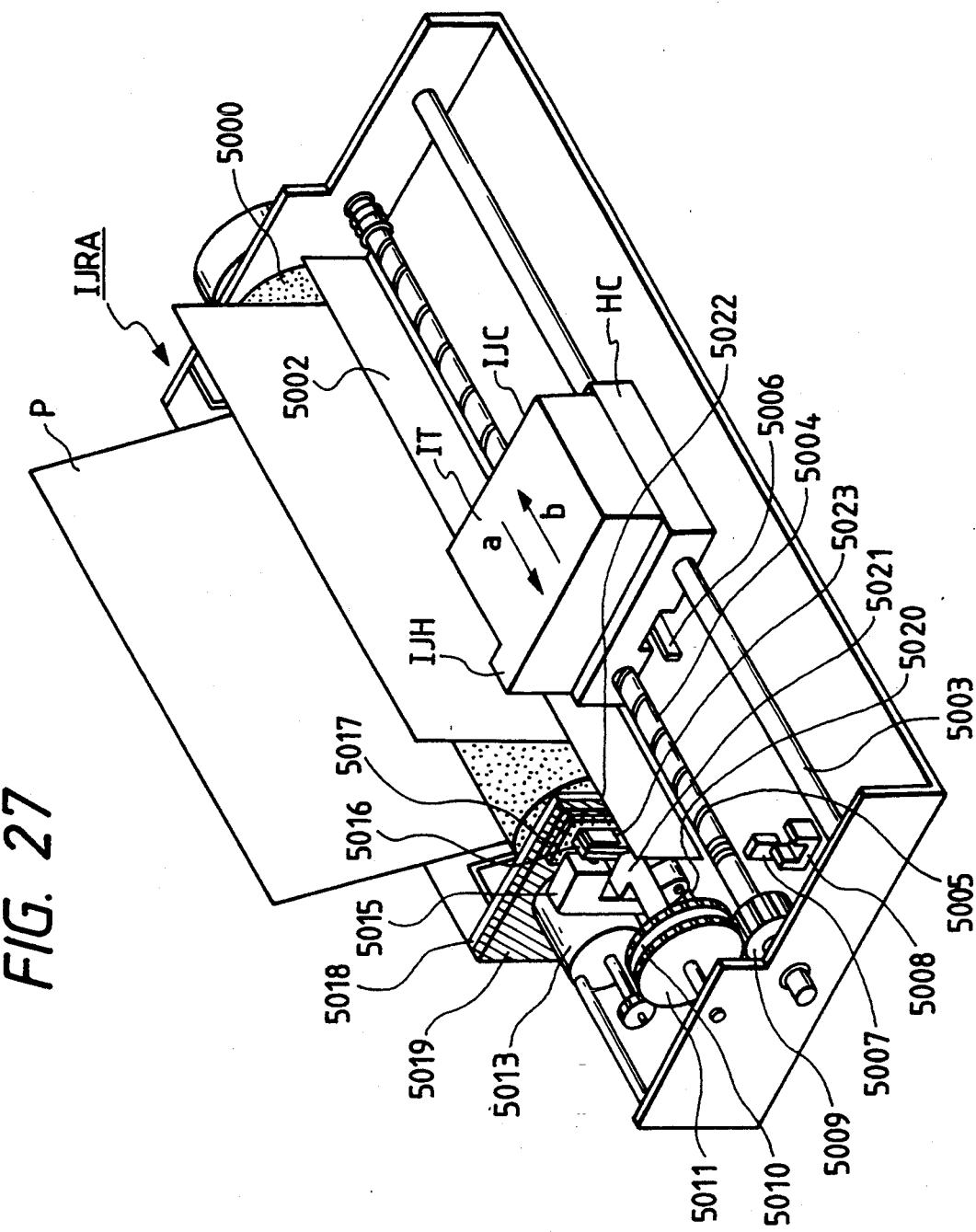

Fig, 20 is a diagram showing a time sequence table showing the executing order of the drawing commands in each region in the third embodiment of the invention;

FIG. 21 is a flowchart for printing processes in a sender computer in the third embodiment of the invention;

FIG. 22 is a diagram showing an example of a print image in the fourth embodiment of the invention;

FIG. 23 is a diagram showing drawing commands in the fourth embodiment of the invention;

FIG. 24 is a diagram showing a sort of kinds of drawing commands in the fourth embodiment of the invention;

FIG. 25 is a diagram showing a drawing packet group in the fourth embodiment of the invention;

FIG. 26 is a diagram showing a structure of a laser beam printer according to the invention; and FIG. 27 is a diagram showing a structure of a thermal jet printer according to the invention.

DETAILED DESCRIPTION OF THE PREFERRED EMBODIMENTS

Embodiments of the present invention will be described hereinbelow with reference to the drawings.

The embodiments intend to realize a high processing speed by processing drawing commands among a plurality of apparatuses. Since there is a causal relation in a drawing command train for printing, however, a correct image is not always formed by merely dividing the drawing command train.

Therefore, to draw the drawing command train in parallel, before developing into the actual drawing images, an influence on the printing region of each drawing command must be examined and the drawing commands must be sorted for every region.

Practically speaking, a coordinate range which is written by each drawing command is compared with a coordinate range in the region to be divided and, as drawing commands which intersect a plurality of regions, it is sufficient to produce a plurality of drawing command trains formed so as to execute the drawing operation in only each region in both of the regions with which the drawing commands intersect.

In case of a drawing command such as a "painting command" in which it is difficult to judge the coordinate range which exerts an influence until the command is executed, it is sufficient to perform the processings by synchronizing with each image processor upon drawing.

Subsequently, various kinds of information (the number of the region (hereinafter, referred to as a band) which was sorted, the total number of bands, the printer on the destination side, the ID No., the document name, the print address) are added to the plurality of drawing command trains formed. The address of the sender computer is added to each computer also including the computer on the producing side and to each printer. The development into the print image is executed in each image processor. After completion of the development in each image processor, the developed data is sent as a print image packet to the printer.

The printer prints the print image on the basis of the print image packer. However, since it is presumed that the packets will reach at random, it is sufficient to execute the printing operations in accordance with a proper order from the packet which has already reached. Namely, there is a tendency such that the printing operation is soon started soon for the band of the simple drawing command and that the printing operation is executed later as the band is difficult as much as possible.

As mentioned above, since the developing operations into the print images are executed at a plurality of locations, when an error occurs in the printer which prints, it is necessary to perform a control such that the print image processing is interrupted at each location and after the error was recovered, the processing is restarted.

When the user wants to interrupt the printing operation, it is necessary to stop the print image processing at each location and to erase the drawing packet data.

Further, signals each indicative of the arrival of the print image packet are sent to the sender computer and the printing time is presumed by the sender computer on the basis of the number and processing time of the print image packets which reached, thereby enabling the user to easily execute the processes. With this method, a printer of a high speed which can be more easily operated can be provided.

Explanation will now be practically made hereinbelow.

FIG. 1 is a block diagram showing the whole concept of an information processing apparatus according to the first embodiment of the invention.

Reference character $B_1$ denotes a computer to form print data according to the embodiment. The user forms print data by using the computer. In the invention, such a computer is called a sender computer.

When the printing process starts, the allocation of a print image making apparatus (namely, referred to as $B_2$) and the selection of the band are executed by the user for the first time. Subsequently, the contents of a command train to be printed are analyzed by the sender computer and the drawing commands are sorted for every band.

Drawing packets are produced by using the sorted drawing commands and are transmitted to the selected print image making apparatus. The sender computer $B_1$ itself develops the drawing packet and the produced print image data is sent as a packet to the printer.

The interaction processings (error processing interruption, display of processing step, and the like) with the user are executed in parallel with the above operations.

$B_2$ denotes the computer as one print image making apparatus in the embodiment. On the basis of the contents of the drawing packet sent from the sender computer $B_1$, the computer $B_2$ produces a print image and retransmits the result to the printer as a print image packet.

$B_1$ and $B_2$ are not always limited to the computer of the same type.

$B_3$ denotes a printer. On the basis of the drawing packet sent from the sender computer $B_1$, the print image is produced and is printed. On the other hand, the print image packets which are sent from the sender computer $B_1$ and the computer $B_2$ are identified to the same document and page on the basis of the ID numbers included in those packets. After that, the printing operation is performed.

The above control will now be described in detail with reference to FIGS. 7, 8, and 9.

$B_4$, $B_5$, and $B_6$ denote LAN interfaces. $B_7$ indicates an LAN itself. In the embodiment, each computer and the printer are connected by the LAN (Ethernet).

Figure 2:
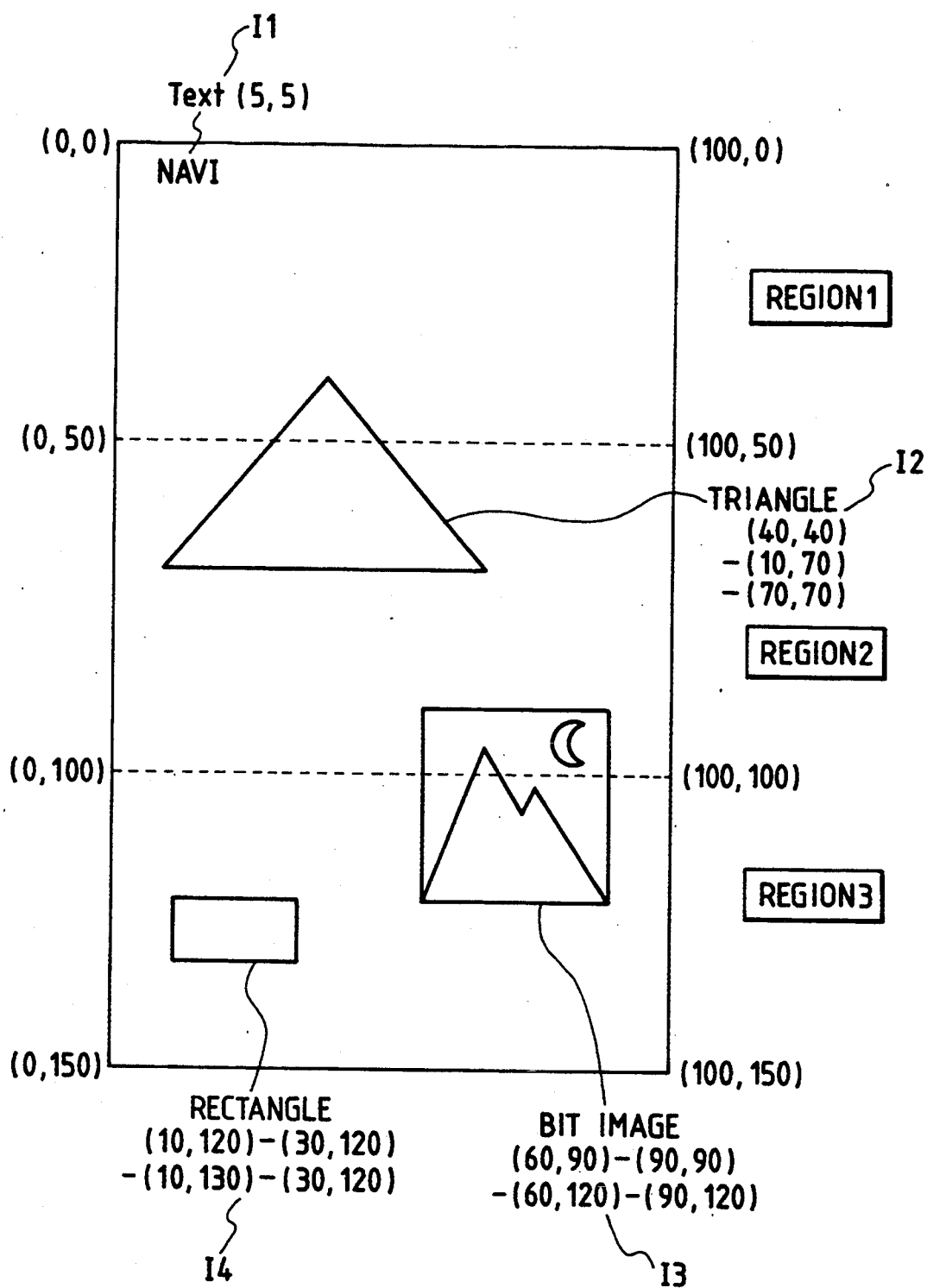
FIG. 2 is a diagram showing an example of print images according to the first embodiment of the invention.

FIG. 2 is a diagram showing an example of a print image in the embodiment. (XX, XX) shown at the left and right edges in the diagram denote coordinates in the print image.

In the diagram, accordingly, the coordinates (0, 0) to (100, 150) are used.

In the print image, there are four figures and texts.

Reference character $I_1$ denotes a text and there are characters of "NAVI" at the coordinates (5, 5). $I_2$ denotes a triangle and the coordinates (40, 40), (10, 70), and (70, 70) are connected. $I_3$ denotes a bit image and pictures of a mountain and a moon are drawn in a rectangle formed by connecting the coordinates (60, 90), (90, 90), (60, 120), and (90, 120).

Reference character $I_4$ denotes a rectangle in which the coordinates (10, 120), (30, 120), (10, 130), and (30, 120) are connected.

In addition to the above characters and figures, in t he image, a broken line i s written by connecting the coordinates (0, 50) and (100, 50) and another broken line is also written by connecting the coordinates (0, 100) and (100,100). Such a broken line indicates a region segment (band) to execute the print image processes by a plurality of computers and printers in parallel. In the embodiment, therefore, it will be understood that a plurality of regions are divided in the direction perpendicular to the paper transporting direction. Such a dividing method is suitable for a so called serial printer because the print head operates in the same direction as the region dividing direction.

"REGION1", "REGION2", and "REGION3" written at the right edge in the drawing denote the name of the above divided regions.

In the embodiment, therefore, if dispersion processings are executed by a total of three image processors, the print images can be formed perfectly in parallel, so that it is convenient.

Referring again to FIG. 2, the triangle $I_2$ and the bit image $I_3$ exist in two regions and when they are drawn, consideration must be made with respect to such a point. In the embodiment, however, by sending all of the drawing commands in each band for three bands and by executing a clipping processing in each region, the display operation of a figure existing in each region can be preferably performed while reducing the sorting processing.

FIG. 3 is a diagram showing drawing commands in the embodiment.

1 denotes a display command of text. Characters "NAVI" are drawn at the coordinates (5, 5) by a Gothic font at a size of 12 points.

2 denotes a drawing command of a rectangle. A rectangle which is formed by connecting the coordinates (10, 120), (30, 120), (10, 130), and (30, 130) is drawn by a replacing mode of an original figure. In the embodiment, discussion is made with respect to only the case of the replacing mode with the original figure. However, in case of executing bit logic arithmetic operations among figures, it is sufficient to describe the logic arithmetic operation in place of "REPLACE".

A printing operation to paint the inside of the rectangle is not executed by a "None" command.

3 denotes a drawing command of a triangle. The triangle which is formed by connecting the coordinates (40, 40), (10, 70), and (70, 70) is drawn in the replacing mode. The inside of the triangle is painted by a pattern 1.

4 denotes a bit image drawing command. A data file of "mountain" is drawn in the replacing mode at the coordinates (60, 90), (90, 90), (60, 120), and (90, 120).

FIG. 4 is a diagram showing drawing command trains which are obtained by sorting the drawing commands mentioned in FIG. 3 for every band (REGION1 to REGION3).

Since both of the text command #1 and the rectangle command #2 in FIG. 3 are closed in the REGION1 and REGION3, they are included in only the command trains of REGION1 and REGION3, respectively.

On the other hand, since the triangle command #3 intersects the REGION1 and REGION2 and the bit image command #4 intersects the REGION2 and REGION3, respectively, the commands are duplicated and provided in each command train of every band.

A clipping command exists in each of the drawing commands #401, #404, and #407. Each image processor virtually executes the drawing by the coordinate system of the command train included in the packet and, after that, performs the clipping operation by the coordinates included in the clipping command.

FIG. 5 is a diagram showing drawing packets which were formed by adding necessary information on the basis of the drawing command trains formed in FIG. 4 and which are transmitted to the image processors.

501 to #514 denote a drawing packet 1, #515 to #528 indicates a drawing packet 2, #529 to #542 denote a drawing packet 3.

The drawing packets are respectively sent to the PRINTER1 of $B_3$, MYPC of $B_1$, and PC2 of $B_2$ and are drawn by each image processor. After that, they are sent as print image packets to the PRINTER1, by which they are printed.

Each row will now be de scribed hereinbelow.

501, #515, and #529 denote destinations and show that the PRINTER1 of $B_3$, MYPC of $B_1$, and PC2 of $B_2$ are the destinations, respectively.

Among them, since the MYPC of $B_1$ is the computer itself which has formed the drawing packets, the physical transmission of the packets is not actually executed. After the drawing operation was performed by using an internal print image processing routine, the drawing image is sent to the PRINTER1 of $B_3$.

502, #516, and #530 denote the names of the printers which finally print.

The print image packet which is formed in each image processor on the destination side is sent to the printer after the image was formed.

503, #517, and #531 denote the names of the computers on the transmitting side. On the basis of the names and the packet IDs, it is judged that the document and the page are the same as the document and the page, thereby synthesizing the print image packets.

504, #518, and #531 denote the band numbers. Each band number indicates that each drawing packet shows the drawing command of which band in each page.

Each of #505, #519, and #532 indicates the total number of bands. The printer calculates a completion ratio of the drawing on the basis of such a total number and the band number and can display as a completion ratio by the computer on the display side or sender side.

Each of #506, #520, and #533 denotes the name of print document. By this item, the name of document which is at present being printed can be displayed on the printer.

Each of #507, #521, and #534 denotes the packet ID to identify the print document. Since there is a possibility such that even the same document is changed to another different document in dependence on the time for printing, the print document is managed by the ID based on the time.

Each of #508, #521, and #534 denotes the address indicative of the location at which the print image formed by each packet is printed in each page.

Each of #509, #522, and #535 denotes the item indicative of the page of the print document.

Each of #510 to #514, #524 to #528, and #538 to #542 denotes the drawing command main body. The contents of them are omitted because they have already been de scribed in FIG. 4.

The above packets are transmitted or received through the LANs of $B_4$, $B_5$, and $B_6$, I/F, and LAN of $B_7$ in FIG. 1.

A control method in each image processor or printer will now be described hereinbelow with reference to flowcharts.

Figure 6:
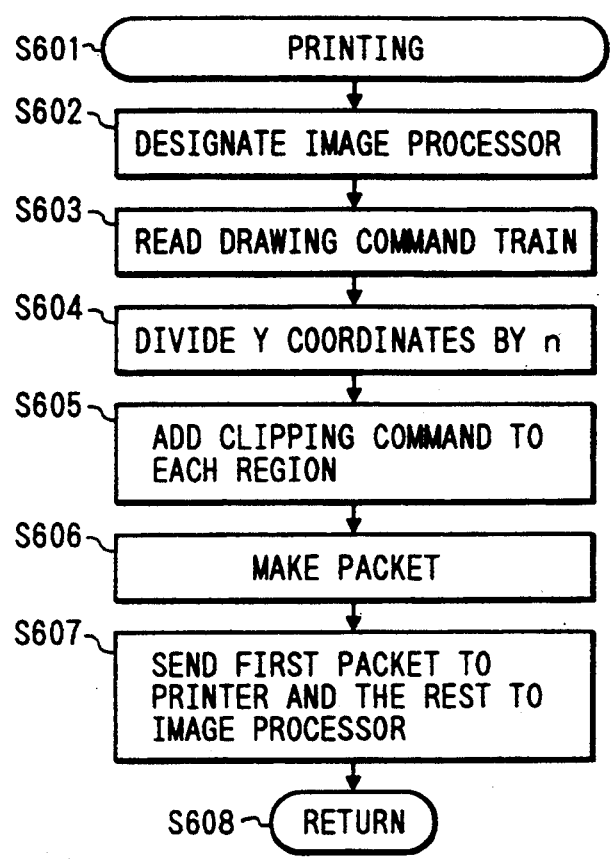
FIG. 6 is a flowchart for printing processes in a sender computer in the first embodiment.

First, the flowchart for the print processings in the sender computer will be first described with reference to FIG. 6.

The print processings are executed after the drawing command train was formed by an application software by an instruction of the print processings from the user.

In step S602, an image processor is designated. The image processor which distributes and forms a print image is designated by an instruction from the user.

In step S603, a drawing command train is read. The drawing commands are formed while setting the transporting direction of the printer into the Y coordinate and setting the direction perpendicular to the paper transporting direction to the X coordinate.

In step S604, the Y coordinate is divided by the number (n) decided in step S602, thereby sorting for every region. In this instance, the drawing commands which intersect such a region are duplicated and are executed in both of the regions.

In step S605, the clipping command is added to the command for each region sorted in step S604. Due to this, even when the drawing process is executed by another image processor, the same image is obtained.

(Practical examples of the sorting processings in steps S604 and S605 are shown in FIGS. 3 and 4.)

In step S606, the printer on the transmission destination side, the ID number, the band number, the total number of bands, and the document No. are designated, thereby forming packets from the command train formed in step S605.

(FIG. 5 shows packets which have been completed as mentioned above.)

In step S607, the produced packets are transmitted. The head packet of the Y coordinate is transmitted to the printer. The remaining packets are sequentially transmitted to the image processor.

In step S608, the processing routine is finished.

Figure 7:
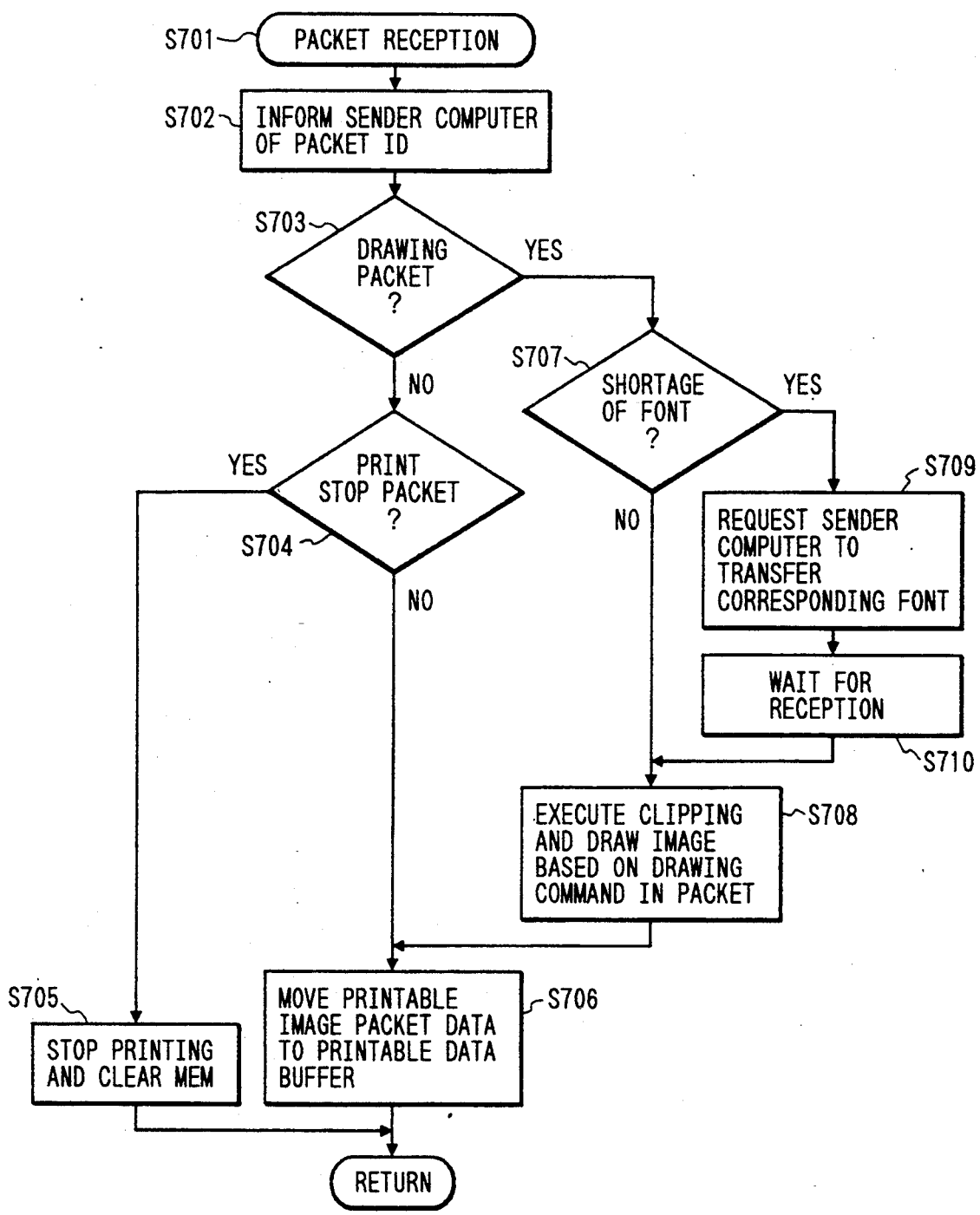
FIG. 7 is a flowchart showing a control method of the print image processings in a printer in the first embodiment of the invention.

FIG. 7 is a flowchart describing the control method of the print image processings in the printer.

In step S702, the ID of the packet received is transmitted to the sender computer. Thus, the sender computer can know the ratio of the print image processings which were finished.

In step S703, a check is made to see if the packet is a drawing packet or not. If YES, in step S707, a check is made to see if there is a shortage of fonts or not by checking the inside of the packet for the preparation to form the print image. If there is a shortage of fonts, in step S709, a transfer request of the fonts which lack is sent to the sender computer. In step S710, the apparatus waits until those fonts are received. After that, the print image is drawn and produced on the basis of the drawing commands in the packet in step S708.

When the packet is not the drawing packet in step S703, a check is made in step S704 to see if it is a print stop packet or not. If YES, in step S705, the printing operation is stopped. On the basis of the information included in the print step packet, the print image forming processing of the corresponding document is also stopped and the contents in the memory are also cleared.

When the packet is not the print stop packet, in step S706, the printable print image packet data is moved to the printable buffer.

Figure 8:
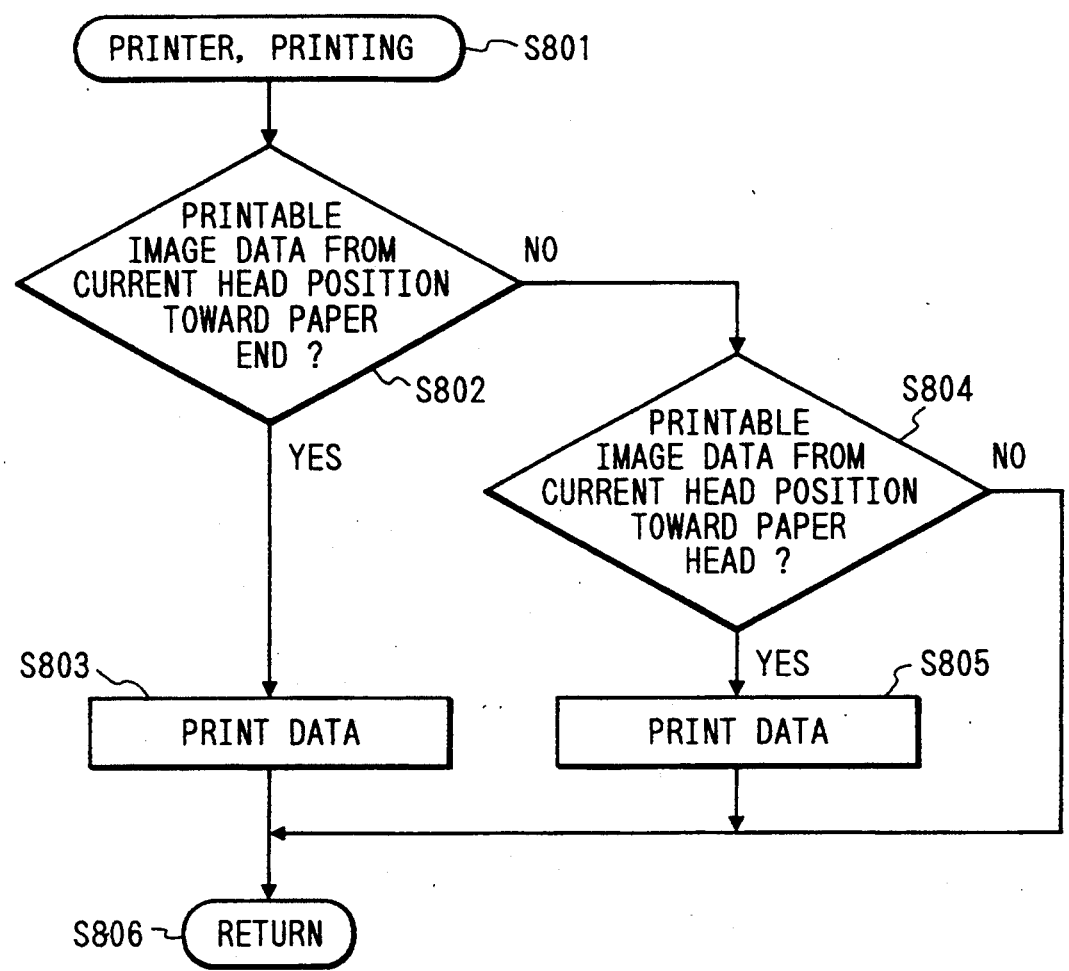
FIG. 8 is a diagram showing a control method of the printing in the printer in the first embodiment of the invention.

FIG. 8 is a flowchart for a control method of the printing operation in the printer.

In step S802, on the basis of the current physical position of the printer head, whether the image data which can be printed in the paper end direction exists or not is discriminated by checking the contents in the printable buffer.

If YES, the image data is printed in step S803.

If NO, in step S804, on the basis of the current physical position of the printer head, whether the image data which can be printed in the paper head direction exists or not is discriminated by checking the contents in the buffer.

If YES, in step S805, the printable image data is printed. If NO, since there is no printable data, the processing routine is finished.

As will be understood from the above control method, in the embodiment since the printing order to print the regions of the print paper is not known, a printer which can perform a back feeding operation must be used.

Figure 9:
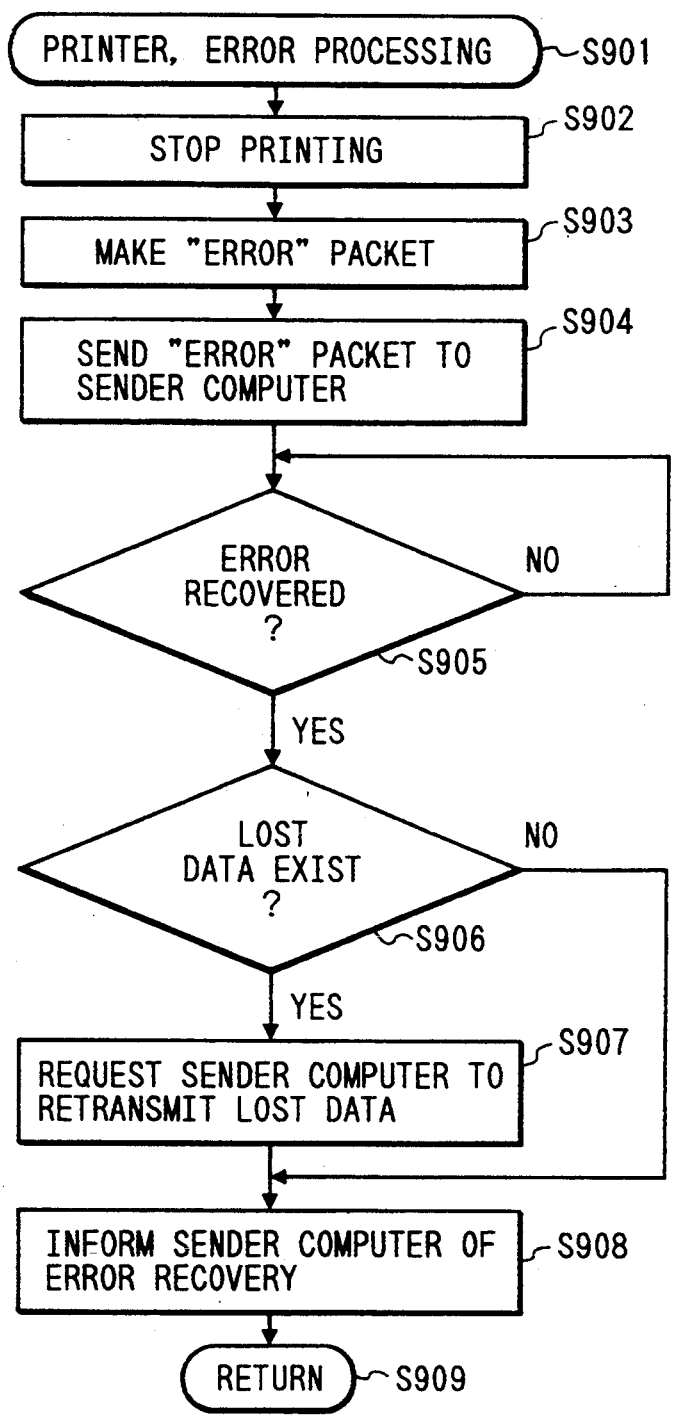
FIG. 9 is a flowchart for describing error processings in the printer in the first embodiment of the invention.

FIG. 9 is a flowchart describing error processings in the printer.

The error processings are executed when there is an error such as jam of the print paper, lack of ink, shortage of papers, or the like which is based on the cause on the printer side.

In step S902, since an error occurs in the printer, the printing operation is stopped.

On the basis of the present error contents, in step S903, a data packet is produced in order to notify the contents to the user. In step S904, the packet is transmitted to the sender computer.

In step S905, a check is made to see if the error processing has been recovered from the error due to the processing from the user or a natural phenomenon or the like. If NO, the apparatus waits until the error is recovered.

In step S906, a check is made to see if there is lost data or not due to the content of the error. For example, in case of the paper jam, the data on the paper is regarded as lost data because the printed paper is deformed due to the paper jam.

If the lost data exists, in step S907, a retransmission request is performed to the sender computer. Therefore, when remaining print image data of the lost page still remains, it is left as it is and a retransmission of only the printed data or the data that is at present being printed is requested.

In step S908, the recovery of the error is transmitted to the sender computer. The sender computer displays the contents on the screen or the like, thereby; making it possible to notify them to the user.

Figure 10:
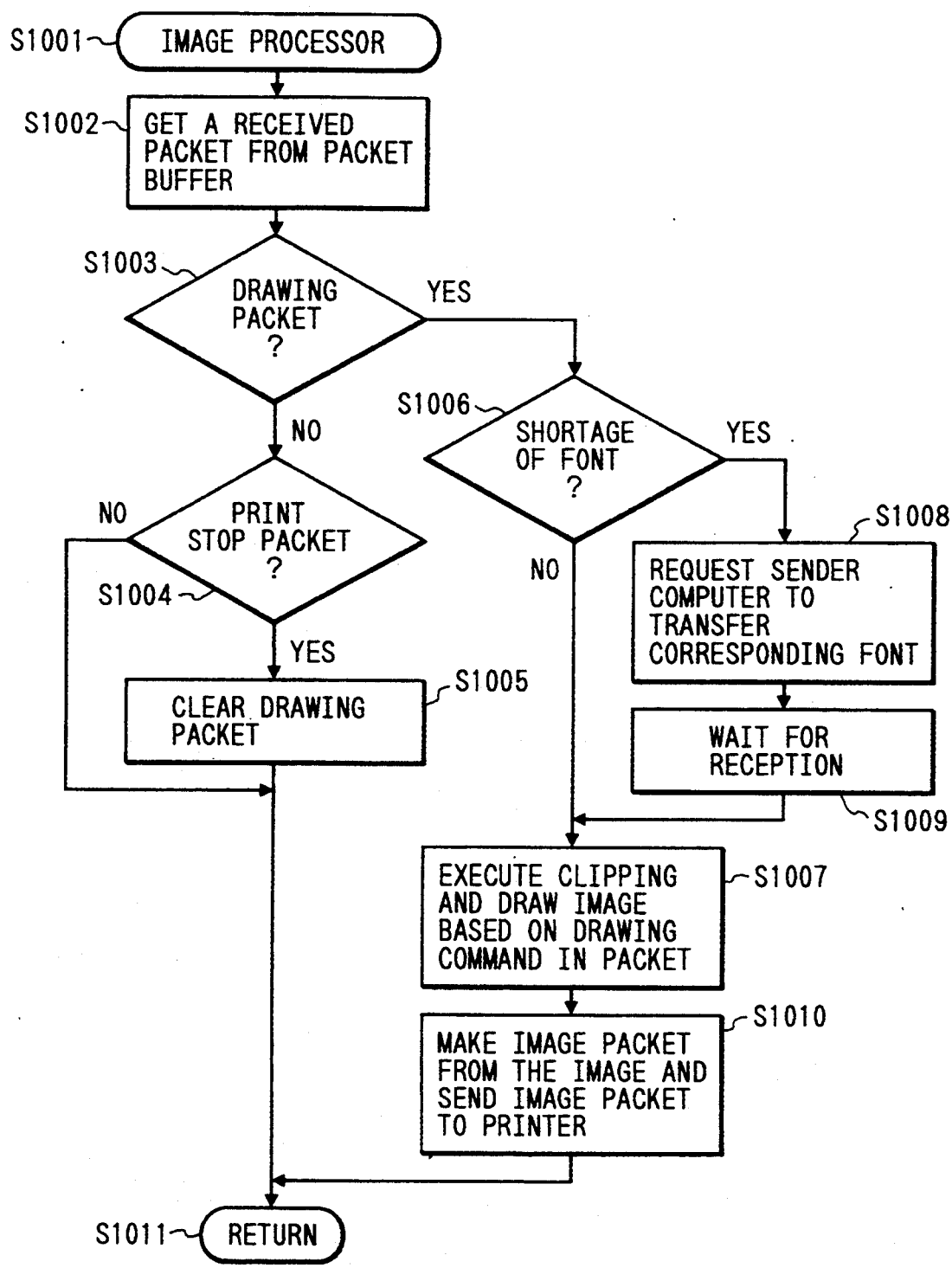
FIG. 10 is a diagram showing a control method of an image processor other than the printer in the first embodiment of the invention.

FIG. 10 shows a control method of another image processor other than the printer.

Since another image processor executes the above processing s while executing another processing (user application or the like), the print image forming process is executed in the background.

In step S1002, the packet which has already reached is taken out from the packet buffer.

In step S1003, a check is made to see if the packet is a drawing packet or not. If YES, in steps S1006 to S1009, the print image forming processing of the drawing packet is executed. The processings in this instance are substantially the same as those in steps S707 to S710 in FIG. 7.

In step S1010, the print image formed by the above processings is transmitted as a print image packet to the printer included in the packet.

In step S1004, a check is made to see if the packet is a process to step the printing processing or not.

If YES, in step S1005, the drawing packets which have already reached are cleared from the information included in the packet. If NO, the processing routine is finished.

Figure 11:
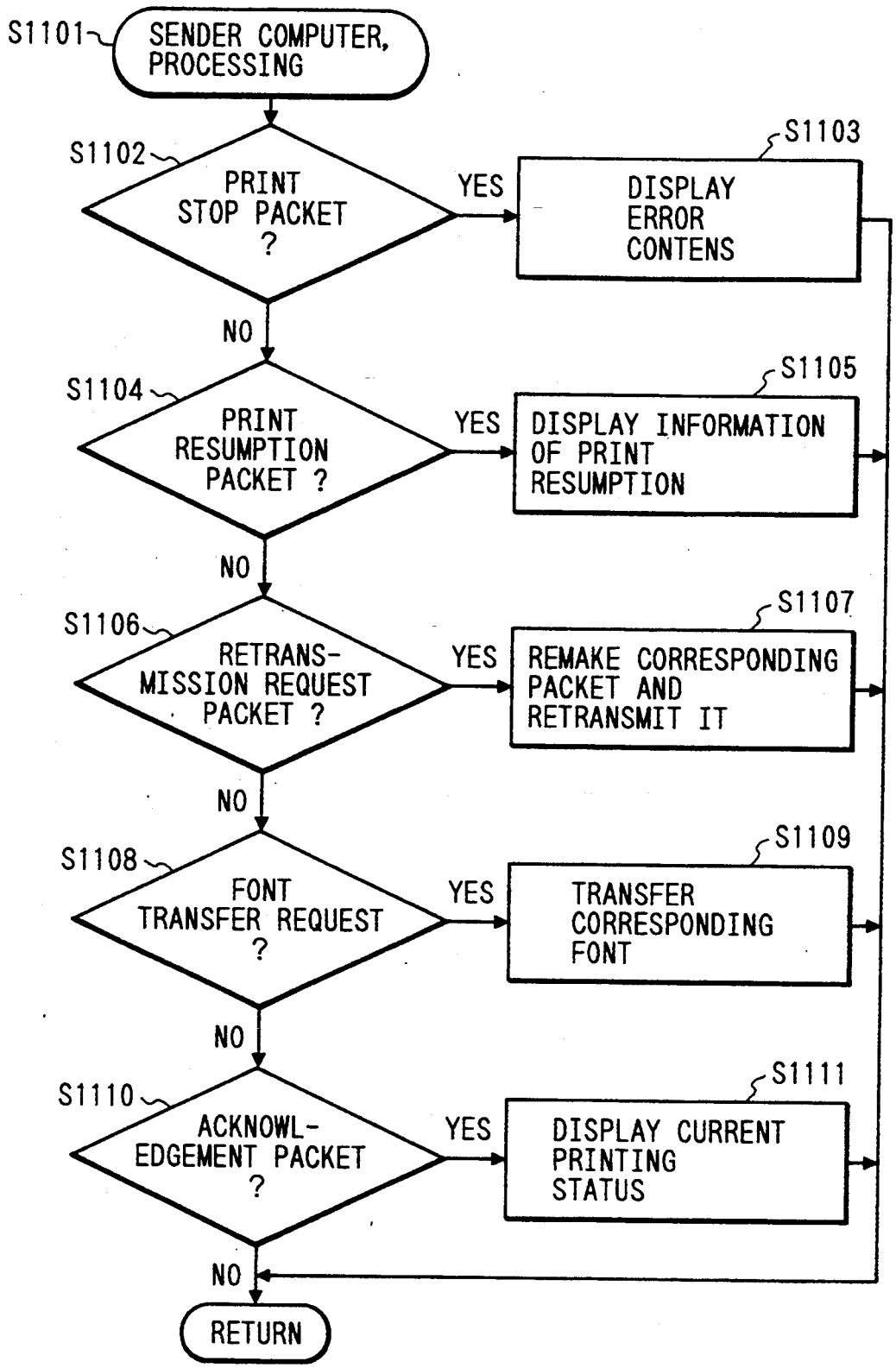
FIG. 11 is a control method in the sender computer in the first embodiment of the invention.

FIG. 11 shows a control method in the sender computer.

In step S1102, a check is made to see if the packet is a print stop packet or not. If YES, in step S1103, the contents of the error is displayed, thereby allowing the user to pay an attention and enabling the error circuit to be recovered.

In step S1104, a check is made to see if the packet is a print restart packet or not. If YES, in step S1105, the restart of the printing is displayed on the screen.

In step S1006, a check is made to see if the packet is a retransmission request packet or not. If YES, in step S1107, such a packet is remade and is again transmitted.

Namely, the drawing packet is sent to a printer when the printer has already printed or formed the images, and otherwise the drawing packet is sent to each image processor.

In step S1108, a check is made to see if a transfer of the shortage of fonts has been requested or not. If YES, those fonts are transferred in step S1109.

In step S1110, the completion of the reception of the packet is notified. If YES, in step S1111, the current printing status (the ratio of the received packets and the transmitted packets) can be displayed from among the total number of transmitted packets.

Embodiment 2

In the embodiment 1, the print data is divided in the direction perpendicular to the paper transporting direction of one page. However, in the second embodiment, the print data is divided on the page unit basis.

A block diagram of the embodiment 2 is substantially the same as that in FIG. 1.

By merely changing the control method as mentioned above, the above two embodiments can be realized.

FIG. 12 shows examples of print images in the embodiment 2. There are texts and figures in three pages.

Reference numeral $I_{1201}$ denotes a text and characters "NAVI" exist at the coordinates (5, 5) of the page 1.

$I_{1202}$ denotes a triangle in which the coordinates (40, 40), (10, 70), and (70, 70) of the page 2 are connected.

$I_{1203}$ denotes a rectangle in which the coordinates (10, 120), (30, 120), (10, 130), and (30, 120) of the page 3 are coupled.

FIG. 13 shows a drawing command train of an image as mentioned above.

Since the fundamental interpretation of each command is similar to that in FIG. 3 in the embodiment 1, its detailed description is omitted here.

1301 denotes a display command of the text. The characters "NAVI" are drawn at the location of the coordinates (5, 5) of the page 1 by the Gothic fonts and at the size of 12 points.

1302 denotes a drawing command of a triangle. The triangle which is formed by connecting the coordinates (40, 40), (10, 70), and (70, 70) of the page 2 is drawn in the replacing mode. The region in the triangle is painted by a pattern 1.

1303 denotes a drawing command of a rectangle. A rectangle which is formed by connecting the coordinates (10, 120), (30, 120), (10, 130), and (30, 130) of the page 3 is drawn in the replacing mode of the original figure.

Since the above commands are based on the page unit, each drawing command doesn't exert an influence on the other commands. Therefore, the packet can be easily formed because it is sufficient to add the destination, the printer, the transmitting side computer, the print document name, the packet ID, and the print page to the above command.

The result is shown as a drawing packet group in FIG. 14.

Since the contents of the drawing packets in FIG. 14 are substantially similar to those in FIG. 5, the descriptions of the overlapped portions are omitted here.

Each row will now be described hereinbelow.

Each of #1401, #1410, and #1419 denotes a destination. PRINTER1, MYPC, and PC2 respectively show the destinations.

Each of #1402, #1411, and #1420 indicates the name of the printer which finally prints.

Each of #1403, #1412, and #1421 denotes the name of transmitting side computer.

Each of #1404, #1413, and #1422 denotes the name of print document. By the above item, the name of document which is at present being printed can be displayed on the printer.

Each of #1405, #1414, and #1423 denotes a packet ID to identify the print document.

Each of #1406, #1415, and #1424 denotes the item indicative of the page of the print document.

Each of #1407 to #1409, #1416 to #1418, and #1425 to #1427 denotes a drawing command main body. The contents of them are omitted here because they have already been de scribed in FIG. 13.

A control method in each image processor or printer will now be described in accordance with a flowchart. The portions similar to those in the embodiment 1 are not described here.

Figure 15:
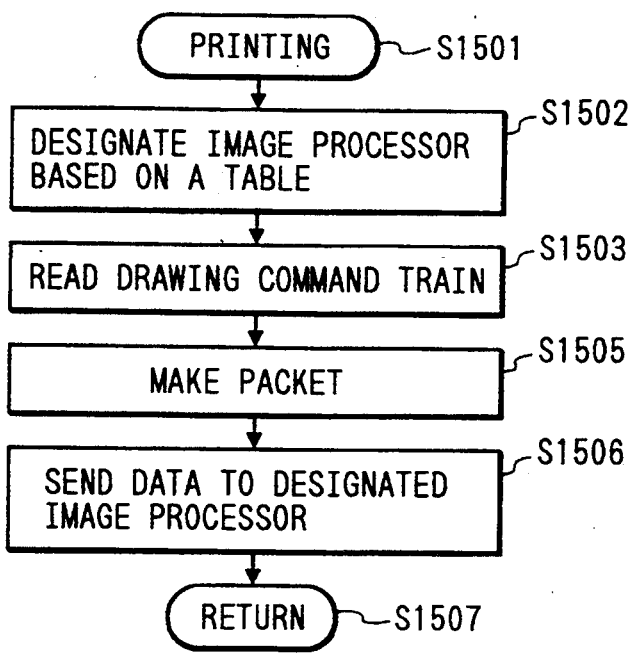
FIG. 15 is a diagram for printing processings in a sender computer in the second embodiment of the invention.

The print processings in the sender computer will be first described with reference to FIG. 15.

The above print processings are executed by an instruction of the printing processes from the user after the drawing command train was formed by an application software.

In step S1502, the image processor is designated. Different from the embodiment 1, on the basis of a predetermined table, the image processor which is used to form the print image is designated.

In step S1503, the drawing command train is read. The drawing commands are made while setting the transporting direction of the paper of the printer to the Y coordinate and setting the direction perpendicular to the transporting direction to the X coordinate.

In step S1505, a packet is formed by designating the transmitting side computer, destination printer, and the like to the drawing command train obtained in step S1503.

In step S1506, data is transmitted to the image processor decided in step S1502.

In step S1507, the processing routine is finished.

The control method for the print image processings in the printer are omitted because they are substantially the same as those in FIG. 7.

Figure 16:
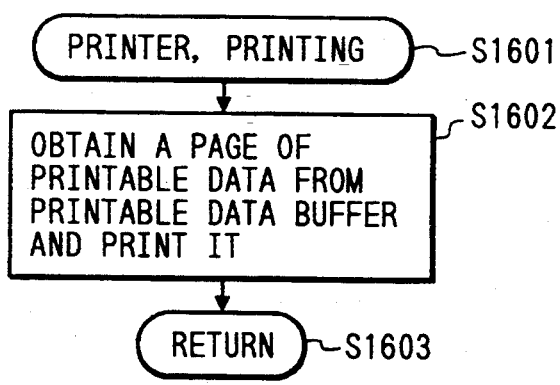
FIG. 16 is a control method of the printing in a printer in the second embodiment of the invention.

FIG. 16 is a diagram for explaining the control method of the printing in the printer.

In case of the embodiment, since the print images are formed every page, different from the case of FIG. 8 in the embodiment 1, it is sufficient to execute the printing operation from the head to the end of the paper without reversing the paper transporting direction.

The order of the pages which reach is at random due to a difference of the complications of the print images. In the embodiment, since the data is printed in accordance with the arriving order of the print image packets. Therefore, although the order of the pages after completion of the printing operations varies, the user can easily arrange the pages. (If necessary, it is also possible to print the page No. and the document name to the back surface of the print paper and to mechanically sort them after the end of the printing operation.)

In step S1602, the print processings are executed. The printable page is taken out from the printable buffer and is printed.

The control methods for the above processings in the printer and the other print image processings in the computers other than the printer and the control method of the transmitting side computer are omitted because they are substantially similar to those in FIGS. 9, 10, and 11, respectively.

Embodiment 3

The embodiment 3 will be described with respect to a control method in the case where a region that is drawn by the command is determined upon execution such as in the "painting" command in case of dividing the print data in the direction perpendicular to the paper transporting direction in the same page in a manner similar to the embodiment 1.

Figure 17:
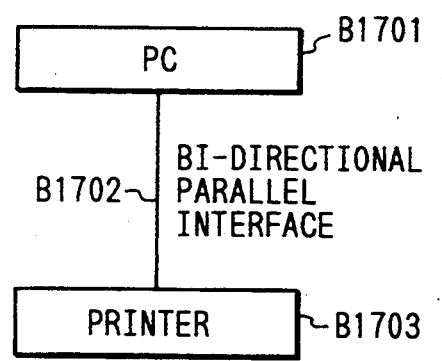
FIG. 17 is a block diagram showing the third embodiment of the invention.

FIG. 17 shows a block diagram of the embodiment 3.

$B_{1701}$ denotes a personal computer for producing a print image in the embodiment.

$B_{1702}$ denotes a bidirectional parallel interface.

In case of the embodiment, commands and data are communicated with both of the PC and the printer.

$B_{1703}$ denotes a printer to produce the print image and to actually print it in accordance with the data from the personal computer $B_{1701}$.

Figure 18:
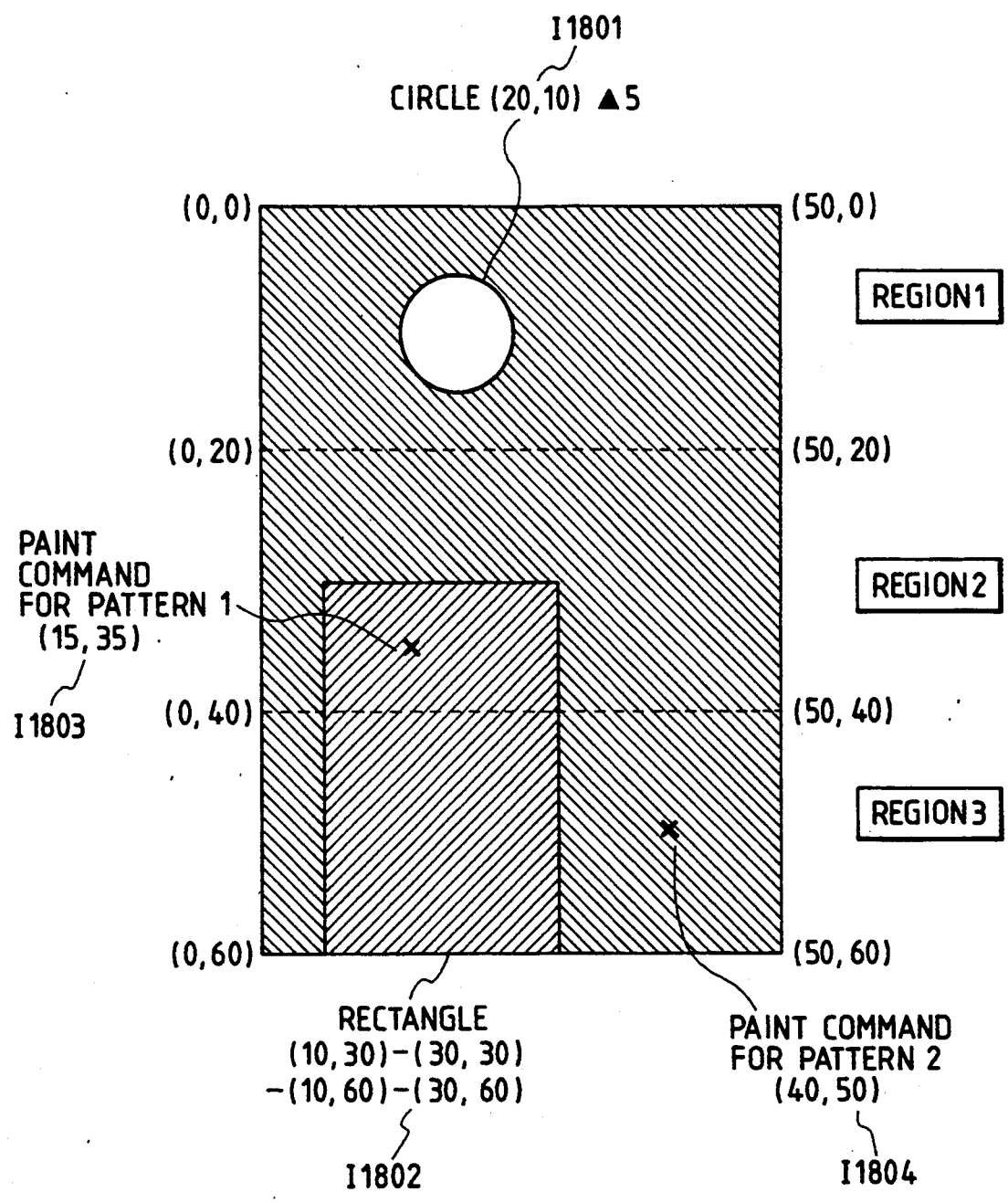
FIG. 18 is a diagram showing an example of a print image in the third embodiment of the invention.

FIG. 18 shows an example of a print image in the embodiment. There are a blank circle, a rectangle painted by the pattern 1, and a background painted by a pattern 2.

Reference numeral $I_{1801}$ denotes a circle written at the coordinates (20, 10) so as to have a radius of 5.

$I_{1802}$ denotes a rectangle which is formed by connecting the coordinates (10, 30), (30, 30), (10, 60), and (30, 60).

$I_{1803}$ denotes the coordinates (15, 35) in which the painting command has been generated. A closed space including such a point is painted by the pattern 1.

$I_{1804}$ denotes the coordinates (40, 50) in which the painting command has been generated. A closed space including such a point is painted by the pattern 2.

A broken line is written by connecting the coordinates (0, 20) and (50, 20) and the coordinates (0, 40), and (50, 40). Such a broken line is a division line of the regions to form images by a plurality of image processors in a manner similar to the case of the broken lines in FIG. 2. The names of those regions are indicated by REGION1, REGION2, and REGION3 on the right side in the diagram.

FIG. 19 shows drawing commands to draw the image in FIG. 18.

1901 denotes a display command of a circle to draw a line of a radius 5 at the coordinates (20, 10).

1902 denotes a drawing command of a rectangle. A rectangle which is formed by connecting the coordinates (10, 30), (30, 30), (10, 60), and (30, 60) is drawn in the replacing mode of the original figure.

1903 denotes a painting command to start the painting operation by the pattern 1 at the coordinates (15, 35). In this instance, a closed space including the above coordinates corresponds to a rectangle that is specified by #1902, so that the region in the rectangle is painted.

1904 denotes a painting command to start to paint by the pattern 2 at the coordinates (40, 50). In this instance, since a closed space including such coordinates corresponds to the outsides of the circle and rectangle which are specified by #1901 and #1902, their backgrounds are painted.

As for the above command group, it is difficult to decide that the painting command exerts an influence on which region until the drawing processing is finished. Therefore, in the case where there is the painting command, the image processors other than the image processor which is at present being executing the painting command wait for the print image processings which are being executed in parallel by a wait command at a time point when the painting command is generated. The commands are synchronized, thereby solving such a problem.

The above example will now be described with reference to FIG. 20.

Figure 20:
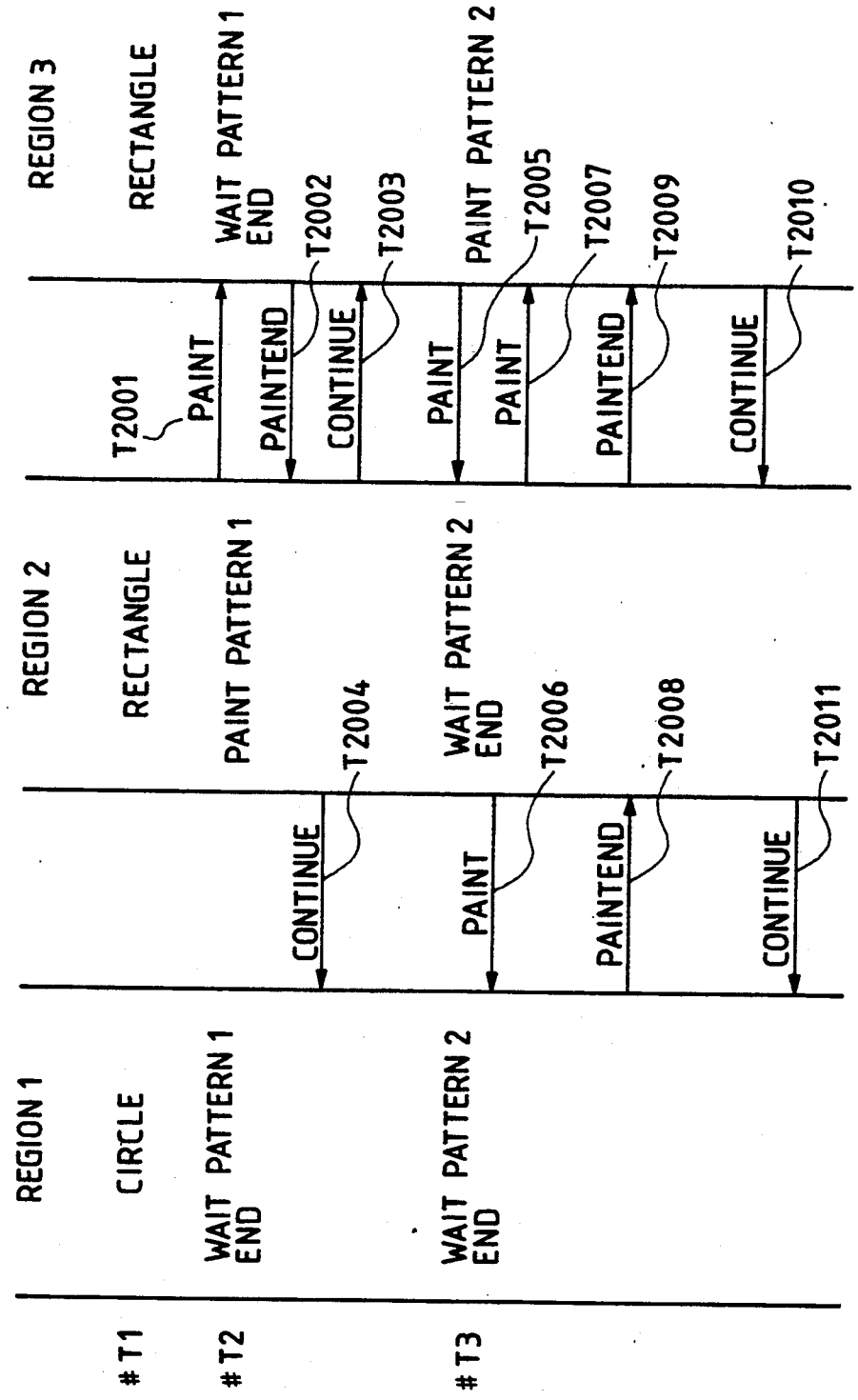

In FIG. 20, an axis of ordinate indicates a time sequence and an axis of abscissa denotes the transmission and reception of commands among the REGION1, REGION2, and REGION3.

First, commands of CIRCLE, RECTANGLE, and RECTANGLE are executed in the respective regions at time $\#T_1$. Since each command doesn't exerts an influence on the other regions, those commands can be executed substantially in parallel. At time $\#T_2$, the REGION2 generates a PAINT PATTERN1 command and the other REGIONs execute a WAIT PATTERN1 command.

Namely, since it will be understood that the PAINT PATTERN1 command of the REGION2 soon exerts an influence on the REGION1 in the REGION2, the PAINT PATTERN1 command is executed by T2001.

In the REGION3, it is painted in response to the above command. Since it will be known that the space whose paint processing has been designated from the REGION2 is a closed region, the REGION3 generates a PAINT END command to the REGION2 in T2002. Thus, since it will be known that all of the PAINT PATTERN1 commands have been finished in the REGION2, a CONTINUE control and is transmitted in T2003 and T2004, thereby continuing the print image processings in the REGIONs.

At time $\#T_3$, a PAINT PATTERN2 command is executed in the REGION2. In the other REGIONs, a WAIT PATTERN2 command is executed.

That is, since it will be understood that the PAINT PATTERN2 command in the REGION3 exerts an influence on the REGION2 in the REGION3, the PAINT PATTERN2 command is transmitted to the REGION2 at T2005. In the REGION2, since it will be understood that the PAINT PATTERN2 command exerts an influence on the REGION1 and REGION3, the PAINT PATTERN2 command is transmitted to the REGION1 and REGION3 in T2006 and T2007.

In the REGION1, the region other than the circle is painted. In the REGION3, the region on the left side of the rectangle is painted. After the painting operations were finished, a PAINT END command is sent to the REGION2 in T2008. The PATTERN END command is sent to the REGION3 in T2009 together with the above information.

In the REGION3, since it will be understood that all of the printing operations were finished by the PATTERN END command, the CONTINUE command is transmitted in T2010 and T2011 and the processings are continued.

Due to this, all of the print image processings are finished.

The print processings in the sender computer will now be described with reference to a flowchart of FIG. 21.

The above print processings are executed after the drawing command train was formed by an instruction of the print processings from the user by an application software.

In step S2102, the drawing command train is read. The drawing commands are formed while setting the paper transporting direction of the printer to the Y coordinate and setting the direction perpendicular to the paper transporting direction to the X coordinate.

In step S2103, the Y coordinate is divided into n equal portions. In the division, it is desirable that the number of dots in the vertical direction of the divided bands is integer times as large as the number of dots in the vertical direction of the head of the printer which is connected.

The drawing commands are sorted for every band by using the bands. In this instance, the drawing commands which intersect such regions are duplicated and are executed in both of the regions.

In step S2104, the clipping command is added to the command of each band sorted in step S2103. Due to this, even when data is drawn by the printer by using the sender computer, the same image is derived.

In step S2105, a check is made to see if the printer is at present drawing or not. If data can be printed, in step S2106, the transmitting side, the printer on the transmitting destination side, the ID No., the band No., the total number of bands, and the document No. are designated and packets are produced and transmitted.

In step S2107, a check is made to see if the sender computer is at present drawing or not. If the drawing operation can be performed, the drawing operation is executed in step S2108. After that, the produced print image is transmitted as a packet to the printer.

In step S2109, a check is made to see if all of the packets have been transmitted or not. If NO, the processing routine is returned to step S2105. If YES, the processing routine is finished.

The packet receiving processing, print processing, and error processing in the printer are substantially similar to those in FIGS. 7, 8, and 9 and the processing in the sender computer is also similar to that in FIG. 11.

Embodiment 4

In the embodiments 1 to 3, although the print data has been divided on the basis of the regions to draw, it is divided by the kind of drawing command in the embodiment 4.

A block diagram of the embodiment 4 is the same as that of FIG. 17.

FIG. 22 shows an example of print images in the embodiment. There are a bit image "mountain2" a rectangle w a text "ABC", and a text "DEF".

$I_{2101}$ denotes a bit image and an image of the name "mountain2" exists in a figure which is formed by connecting the coordinates (20, 30), (60, 30), (2 0, 8 0), and (6 0, 8 0).

$I_{2102}$ denotes a rectangle which is formed by connecting the coordinates (10, 20), (40, 20), (10, 60), and (40, 60).

$I_{2103}$ denotes a text and characters of "ABC" exist at the coordinates (15, 45).

$I_{2104}$ denote s a text and character s of "DEF" exist at the coordinates (40, 15).

FIG. 23 shows a drawing command train of such an image.

Since a fundamental interpretation of each command is similar to that in FIG. 3 in the embodiment 1, its detailed description is omitted here.

2201 denote s a bit image drawing command. A data file of "mountain2" is drawn in the replacing mode at the coordinates (20, 30), (60, 30), (20, 80), and (60, 80).

2202 denotes a drawing command of a rectangle. A rectangle which is formed by connecting the coordinates (10, 20), (4 0, 20), (10, 60), and (40, 6 0) is drawn in the replacing mode of the original figure.

2203 denotes a display command of the text. The characters of "ABC" are drawn by Gothic fonts at a size of 12 points at the coordinates (15, 45).

2204 denotes a display command of a text. The characters of "DEF" are drawn at the coordinates (40, 15) by the Gothic fonts and at the size of 12 points.

The command group is sorted into the text commands and the others in the embodiment. This is because since a large amount of front data is needed to draw a text command, particularly, an outline font, it is rational for the sender computer to execute the print image processing of the text command. On the other hand, remaining various kinds of vector graphics, bit image, and the like can be drawn so long as there are predetermined processing programs and memories, so that they can be drawn by a printer or the like.

Therefore, the commands are allocated to the sender computer and the printer by a method as shown in FIG. 24.

Since a causal relation also exists in the above command group, the print image cannot be obtained so long as the high/low relation is not identified. Therefore, before a plurality of image processors actually execute the print image processings in parallel, the drawing command which is located at the highest priority and its region when the print image is obtained are previously detected, a clipping command for the region is added to each drawing command, and the print image development is executed after that. Due to this, the correct images can be formed in parallel.

Since the high/low relation among the print images has already been identified, they can be printed at the stage in which the print images have been formed.

There is also a method whereby all of the images are previously developed into the bit images and they are synthesized in accordance with the causal relations in a page memory in the printer or the like. However such a method is irrational because an amount of memory capacity which is used is large.

FIG. 25 shows a group of drawing packets which are formed by the above method described.

Since the drawing packets are also similar to those in FIG. 5, their overlapped portions are not described here.

2401 and #2411 denote destinations. PRINTER1 and MYPC denote addresses respectively.

Each of #2402 and #2412 denotes the name of the printer which finally prints.

Each of #2403 and #2413 denotes the name of sender computer on the transmitting side.

Each of #2404 and #2414 denotes the name of print document. Due to such an item, the name of document which is at present being printed can be displayed on the printer.

Each of #2405 and #2415 denotes a packet ID to identify the print document.

Each of #2406 and #2416 denotes the item indicative of the page of print document.

Each of #2407 to #2410 and #2417 to #2420 denotes a drawing command main body. There is the following difference between the content of the drawing command main body and the drawing command described in FIG. 23. Namely, FIG. 23 shows a simple command group which don't consider the high/low relation of the figures. FIG. 24 shows the group of commands which are formed in the regions except the regions in which the results by the other commands are stored in order to execute the clipping processing for the processing of the high/low relation.

Specifically speaking, in FIG. 23, the bit image command has a rectangular shape. In FIG. 24, the bit image command has an L-shaped hexagon shape. One RECTANGLE command in FIG. 23 is converted into a RECTANGLE command and a POLYGON command in FIG. 24.

Such a conversion can be easily performed because a polygon is extracted from a polygon.

As described above, in the case where the print image processings are performed in accordance with the kind of drawing command and the print images are synthesized by being conscious of the print image, the methods described in the embodiment 1 can be used finally as a processing method upon printing by the printer and a control method of the packets.

As a practical example of the printer $B_3$ in the embodiment, a construction of a laser beam printer and an ink jet printer will now be described with reference to Figs, 26 to 27. The printer to which the embodiment is applied is not limited to the laser beam printer or ink jet printer but a printer of another printer system can be also used.

FIG. 26 is a cross sectional view showing a construction of the first recording apparatus to which the invention can be applied and, for example, shows the case of a laser beam printer (LBP).

In the diagram, reference numeral 1500 denotes an LBP main body. Print information (character codes or the like), form information, macro instructions, or the like which is supplied from a host computer connected to the outside is inputted to the LBP main body 1500 and stored therein. In accordance with those information, the corresponding character patterns, form patterns, and the like are formed and an image is formed on a recording paper as a recording medium. Reference numeral 1501 denotes an operation panel on which switches for operation, an LED display, and the like are arranged; and 1000 denotes a printer control unit to control the whole LBP main body 1500 and to analyze the character information or the like which is supplied from the host computer. The printer control unit 1000 mainly converts the character information into the video signal of the corresponding character pattern and supplies to a laser driver 1502. The laser driver 1502 is a circuit to drive a semiconductor laser 1503 and on/off switches a laser beam 1504 which is emitted from the semiconductor laser 1503 in accordance with the inputted video signal. The laser beam 1504 is swung to the right and left by a rotary polygon mirror 1505 and scan s and expose s on an electro static drum 1506. Thus, an electrostatic latent image of the character pattern is formed on the drum 1506. The latent image is developed by a developing unit 1507 arranged around the drum 1506 and is copy transferred onto the recording paper after that. Cut sheets are used as recording papers. The cut sheet recording papers are enclosed in a sheet cassette 1508 set in the LBP 1500 and are picked up and fed into the apparatus main body by a feed roller 1509 and transporting rollers 1510 and 1511. The recording paper is conveyed to the drum 1506.

FIG. 27 is an external view showing a construction of the second recording apparatus to which the invention can be applied. For example, FIG. 27 shows the case of an ink jet recording apparatus (IJRA).

In the diagram, a lead screw 5005 is rotated in association with the forward/reverse rotation of a driving motor 5013 through driving force transfer gears 5011 and 5009. A carriage HC has a pin (not shown) which is come into engagement with a spiral groove 5004 of the lead screw 5005. The carriage HC is reciprocated in the directions of arrows a and b. An ink jet cartridge IJC is mounted on the carriage HC. Reference numeral 5002 denotes a paper pressing plate for pressing the paper onto a platen 5000 in the moving direction of the carriage. Reference numerals 5007 and 5008 denote photocouplers which function as home position detecting means for detecting the existence of a lever 5006 of the carriage in a region corresponding to each photocoupler, thereby performing a switching operation of the rotating direction of the motor 5013 or the like. Reference numeral 5016 denotes a member to indicate a cap member 5022 to cap the whole surface of a recording head; and 5015 indicates a sucking means for sucking the air in the cap. The sucking means 5015 executes a sucking recovery of the recording head through an opening 5023 in the cap. Reference numeral 5017 denotes a cleaning blade which can be moved in the front/back direction by a member 5019; 5018 a main body supporting plate for supporting the cleaning blade 5017 and the member 5019; and 5021 a lever to start the sucking operation of the sucking recovery. The lever 5021 is moved in association with the movement of a cam 5 020 which is come into engagement with the carriage. A driving force from the driving motor is transferred and controlled by well-known transfer means such as a clutch switching device or the like.

Either desired one of the capping process, cleaning process, and sucking recovery process can be executed at the corresponding position by the operation of the lead screw 5005 when the carriage reaches the home position side region. However, it is sufficient to construct so as to execute a desired operation at a well-known timing.

As described above, by providing means for dividing the print data into a plurality of portions and by synthesizing the divided print data into a print image by using a plurality of image processors the printing operation can be extremely promptly finished as compared with that in case of synthesizing the print images by one information processing apparatus.

The invention is effective for a color image printing of a natural picture or a high resolution printing of 1000 dpi or more which will be presumed in future.

According to the invention, the information processing ability of the sender computer and the information processing ability of the printer which could not effectively be used hitherto upon printing and the information processing abilities of further other computers can be simultaneously used in parallel. Therefore, a high processing ability can be provided for the processor while minimizing an investment in the processor.

According to the invention described above, it is possible to provide the information processing method and apparatus wherein a drawing command is divided into a plurality of drawing commands, the divided drawing commands and the information to designate the printer are added to thereby form a plurality of drawing packet groups, and the packet groups are transmitted so as to be allocate to a plurality of information processing sections in order to convert the packet groups into images suitable for the printing mechanism.

What is claimed is:

1. An information processing method comprising the steps of:
    dividing a drawing command into a plurality of drawing commands;
    adding the divided drawing commands and information to designate a printer, thereby forming a plurality of drawing packet groups; and
    transmitting the packet groups so as to be allocated to a plurality of information processing sections in order to convert the packet groups into images suitable for a printing mechanism
    wherein division of the drawing command is executed every page to be printed.

2. A method according to claim 1, wherein a head packet of the page is always transmitted to the printer.

3. A method according to claim 1, wherein a print stop packet is transmitted from the printer to the information processing sections in accordance with an internal state of the printer, the conversion of the image is interrupted, and internal data is held.

4. A method according to claim 1, wherein data which was lost due to the internal state of the printer is retransmitted from the information processing section, a print restart packet is transmitted to the information processing section, and the conversion of the image in the information processing section is restarted.

5. An information processing apparatus comprising:
    dividing means for dividing a drawing command into a plurality of drawing commands;
    producing means for adding the divided drawing commands and information to designate a printer, thereby producing a plurality of drawing packet groups; and
    transmitting means for transmitting said packet groups to a plurality of information processing sections so as to be allocated to said plurality of information processing sections in order to convert the packet groups into the images suitable for a printing mechanism,
    wherein the division of the drawing command by said dividing means is executed every page to be printed.

6. An apparatus according to claim 5, further comprising printer means for printing images on a basis of the plurality of drawing packet groups.

7. An apparatus according to claim 6, wherein the head packet of the page is always transmitted to the printer means.

8. An apparatus according to claim 6, wherein said printer means transmits a print stop packet to the information processing section in accordance with an internal state of the printer means and holds the internal data.

9. An apparatus according to claim 6, wherein data which was lost due to an internal state of said printer means is retransmitted from the information processing section and a print restart packet is transmitted to said information processing section, thereby enabling conversion of the image in the information processing section to be restarted.

10. An information processing method comprising the steps of:
    dividing a drawing command into a plurality of drawing commands;
    adding the divided drawing commands and information to designate a printer, thereby forming a plurality of drawing packet groups; and transmitting the packet groups so as to be allocated to a plurality of information processing sections in order to convert the packet groups into images suitable for a printing mechanism, wherein the head packet of the plurality of drawing packet groups is always transmitted to the printer.

11. A method according to claim 10, wherein the division of the drawing command is executed every page to be printed.

12. A method according to claim 10, wherein a print stop packet is transmitted from the printer to the information processing sections in accordance with an internal state of the printer, the conversion of the image is interrupted, and internal data is held.

13. A method according to claim 10, wherein data which was lost due to the internal state of the printer is retransmitted from the information processing section, a print restart packet is transmitted to the information processing section, and conversion of the image in the information processing section is restarted.

14. An information processing apparatus comprising:
dividing means for dividing a drawing command into a plurality of drawing commands;
producing means for adding the divided drawing commands and information to designate a printer, thereby producing a plurality of drawing packet groups; and
means for providing the packet groups to a plurality of information processing sections so as to be allocated to the plurality of information processing sections in order to convert the packet groups into images suitable for printing, wherein a head packet of the plurality of drawing packet groups is always transmitted to the printer.

15. An apparatus according to claim 14, further comprising printer means for printing images on a basis of the plurality of drawing packet groups.

16. An apparatus according to claim 15, wherein the division of the drawing command by said dividing means is executed every page to be printed.

17. An apparatus according to claim 15, wherein said printer means transmits the print stop packet to the information processing section in accordance with the internal state of the printer means and holds the internal data.

18. An apparatus according to claim 15, wherein data which was lost due to an internal state of said printer means is retransmitted from the information processing section and a print restart packet is transmitted to the information processing section, thereby enabling conversion of the image in the information processing section to be restarted.

19. An apparatus according to claim 14, wherein one of the plurality of information processing sections is provided in the printer.

* * * * *

UNITED STATES PATENT AND TRADEMARK OFFICE
CERTIFICATE OF CORRECTION

PATENT NO. : 5,422,729
DATED : June 6, 1995
INVENTOR(S) : SHIGEO YOSHIDA

It is certified that error appears in the above-identified patent and that said Letters Patent is hereby corrected as shown below:

IN THE DRAWINGS

Sheet 10 of 22, "CONTENS" should read --CONTENTS--.

COLUMN 1

Line 14, "only" (second occurrence) should be deleted.

COLUMN 4

Line 31, "soon" (first occurrence) should be deleted.

COLUMN 5

Line 7, "processing inter-" should read --processing, inter- --.
Line 48, "in t he" should read --in the--.
Line 49, "line i s" should read --line is--.
Line 59, "so called" should read --so-called--.

COLUMN 6

Line 65, "de scribed" should read --described--.

COLUMN 7

Line 44, "de scribed" should read --described--.

COLUMN 9

Line 36, "processing s" should read --processings--.

UNITED STATES PATENT AND TRADEMARK OFFICE
CERTIFICATE OF CORRECTION

PATENT NO. : 5,422,729

DATED : June 6, 1995

INVENTOR(S) : SHIGEO YOSHIDA

It is certified that error appears in the above-identified patent and that said Letters Patent is hereby corrected as shown below:

COLUMN 11

Line 14, "de scribed" should read --described--.
    Line 51, "which reach" should be deleted.

COLUMN 13

Line 14, "exerts" should read --exert--.

COLUMN 16

Line 26, "cross sectional" should read --cross-sectional--.
    Line 33, "is" should read --are--.
    Line 34, "is" should read --are--.
    Line 36, "tion," should read --tions,--.
    Line 53, "scan" should read --scans--.
    Line 54, "s and" should read --and--; "expose s" should read --exposes--; and "electro static" should read --electrostatic--.
    Line 58, "copy transferred" should read --copy-transferred--.

COLUMN 17

Line 4, "is" should be deleted.
    Line 5, "come" should read --comes--.
    Line 29, "cam 5 020" should read --cam 5020--.
    Line 65, "allocate" should read --allocated--.

UNITED STATES PATENT AND TRADEMARK OFFICE
CERTIFICATE OF CORRECTION

PATENT NO. : 5,422,729

DATED : June 6, 1995

INVENTOR(S) : SHIGEO YOSHIDA

It is certified that error appears in the above-identified patent and that said Letters Patent is hereby corrected as shown below:

COLUMN 18

Line 11, "mechanism" should read --mechanism,--.
Line 14, "1,wherein" should read --1, wherein--.

Signed and Sealed this

Twenty-sixth Day of September, 1995

BRUCE LEHMAN

Attest:

Attesting Officer

Commissioner of Patents and Trademarks